United States Patent [19]
Haselby et al.

[11] Patent Number: 5,991,055
[45] Date of Patent: Nov. 23, 1999

[54] UNDERPULSED SCANNER WITH VARIABLE SCAN SPEED, P. W. M. COLOR BALANCE, SCAN MODES AND COLUMN REVERSAL

[75] Inventors: Robert D. Haselby; Curtis J. Behrend, both of San Diego; Jack H. Schmidt, Carlsbad; Morad Samii, Poway, all of Calif.

[73] Assignee: Hewlett-Packard Company, Palo Alto, Calif.

[21] Appl. No.: 08/717,921

[22] Filed: Sep. 23, 1996

[51] Int. Cl.⁶ .................................. H04N 1/46; G06K 9/36
[52] U.S. Cl. .................... 358/509; 358/509; 358/505; 358/511; 358/515; 382/250; 345/340
[58] Field of Search ...................... 358/509, 505, 358/511, 515; 345/340; 382/250

[56] References Cited

U.S. PATENT DOCUMENTS

| | | | |
|---|---|---|---|
| 4,229,095 | 10/1980 | Mir | 358/500 |
| 4,356,347 | 10/1982 | Wiener | 178/346 |
| 4,375,647 | 3/1983 | Mir | 358/505 |
| 4,466,020 | 8/1984 | O'Connell | 358/293 |
| 5,043,827 | 8/1991 | Beikirch . | |
| 5,368,334 | 11/1994 | Christy et al. | 430/97 |
| 5,442,188 | 8/1995 | Brimbal et al. | 250/566 |
| 5,537,229 | 7/1996 | Brandestini et al. | 358/362 |
| 5,572,630 | 11/1996 | Azuma et al. | 395/111 |
| 5,676,475 | 10/1997 | Dull | 400/174 |
| 5,728,495 | 3/1998 | Ozawa | 250/492.1 |
| 5,744,815 | 4/1998 | Gurevich et al. | 250/566 |

FOREIGN PATENT DOCUMENTS 38070  10/1981  European Pat. Off. ......... H04N 1/10

*Primary Examiner*—Edward L. Coles
*Assistant Examiner*—Twyler Lamb

[57] ABSTRACT

Scan exposure in a row or swath scanner is controlled by pulsing light sources with pulses that are separated by dark intervals from each other—and from the detector readout periods. Detector sequencing is thereby made independent of the velocity of the pixel-line advance mechanism. Different pulse widths for different colors provide color correction without calculation, or regularize color-space conversion calculations where needed. In a swath scanner, known technology of printing modes is imported into the scanning context. Order of pixel columns within each swath is reversed for printing—permitting use of novel configurations such as a dual-parallel-flatbed copier in which a single common scan-and-advance mechanism simultaneously transports the scan sensor and printheads. To produce mirror images, this configuration is also used without column reversal. In addition to red, green and blue light sources, an infrared source is used for reading invisible indicia that identify forms or media types. The scan sensor is also used for auxiliary printing functions.

31 Claims, 18 Drawing Sheets

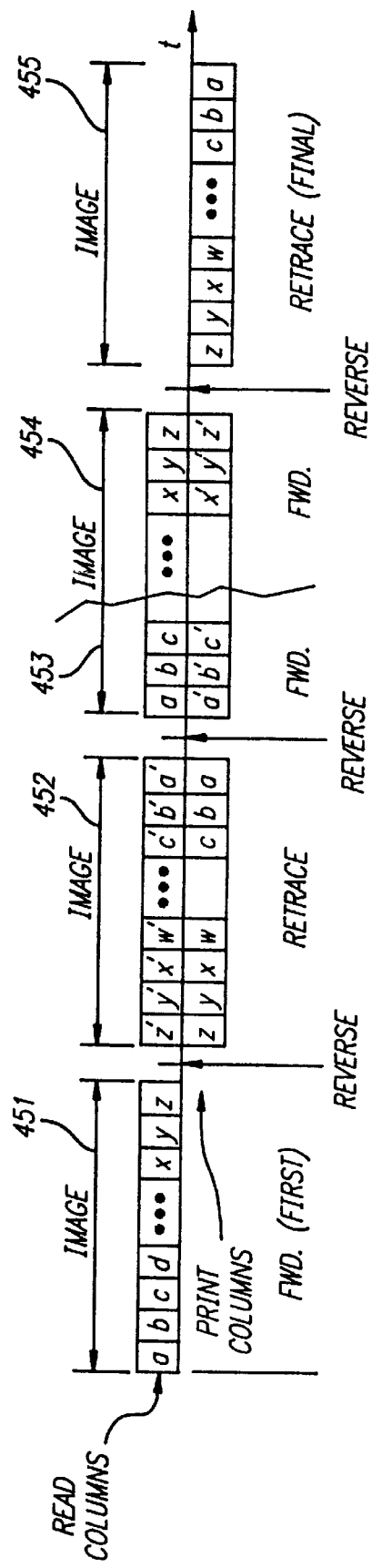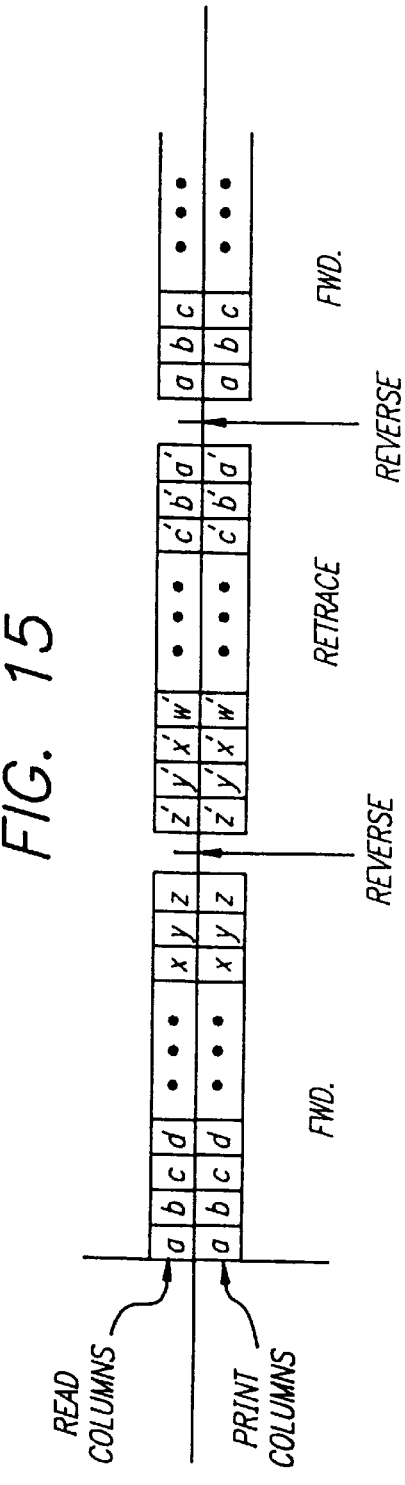
FIG. 12
FIG. 15

UNDERPULSED SCANNER WITH VARIABLE SCAN SPEED, P. W. M. COLOR BALANCE, SCAN MODES AND COLUMN REVERSAL

RELATED PATENT DOCUMENTS

The following ten coowned U.S. utility-patent documents are hereby incorporated by reference in their entirety into this document. The first seven are copending herewith in the United States Patent and Trademark Office. One is in the name of Jack H. Schmidt, and entitled "SWATH SCANNING SYSTEM USING AN OPTICAL IMAGER", identified as Hewlett Packard Company docket number PD-10960200-1, and filed Jun. 17, 1996, and subsequently assigned utility-patent application Ser. No. 08/665,777. The second such document is Ser. No. 08/056,633, filed Apr. 30, 1993, in the name of Lance Cleveland, and entitled "MAXIMUM-DIAGONAL PRINTMASK & MULTIPASS PRINTING MODES, FOR HIGH QUALITY AND HIGH THROUGHPUT WITH LIQUID-BASE INKS", and issued as U.S. Pat. No. 5,677,716 on Oct. 14, 1997. Third and fourth related documents are Ser. Nos. 08/399,007 and 08/400,056, both filed Mar. 6, 1995, in the names of Nicholas Nicoloff et al., and respectively entitled "RESOLUTION-DEPENDENT AND COLOR-DEPENDENT PRINT MASKING" and "MIXED-DENSITY PRINT MASKING IN A MIXED-SWATH-HEIGHT PRINTER" and issued as U.S. Pat. No. 5,883,644. A fifth related document is in the names of Cobbs et al., Ser. No. 08/540,908, entitled "MULTIPLE INKJET ALIGNMENT BY SCANNING A REFERENCE PATTERN AND SAMPLING SAME WITH REFERENCE TO A POSITION ENCODER" and issued as U.S. Pat. No. 5,600,350 on Feb. 4, 1997. A sixth such document is in the names of Sievert et al., Ser. No. 08/625,422, entitled "SYSTEMS AND METHOD FOR ESTABLISHING POSITIONAL ACCURACY IN TWO DIMENSIONS BASED ON A SENSOR SCAN IN ONE DIMENSION" and issued as U.S. Pat. No. 5,796,414 on Sep. 18, 1998. A seventh such document is in the names of Michael D. Dobbs et al., Ser. No. 08/601,421 (which is a file-wrapper continuation of Ser. No. 08/113,875), entitled "IMAGE SCANNING HEAD FOR A THERMAL INK JET PRINTER" and issued Jun. 16, 1998, as U.S. Pat. No. 5,767,988. An eighth such document is in the names of Chuin K. Lim and Frank L. Cloutier, Ser. No. 08/113,878, entitled "LOW COST SCANNER FOR EXISTING INK JET PRINTER" and issuing Jul. 2, 1996, as U.S. Pat. No. 5,532,825. Ninth and tenth related documents are U.S. Pat. Nos. 4,963,882 and 4,965,393 of Mark S. Hickman.

All ten patent documents described above, and all art citations therein and in prosecution thereof, are hereby wholly incorporated by reference herein.

FIELD OF THE INVENTION

This invention relates generally to image-related devices of desktop size, and drafting-room size, for acquiring images from or printing text or graphics onto image media; and more particularly to novel systems for illumination, or color separation, or swath scanning, or integrated swath scanning and swath printing, for such a device.

By the phrase "image-related device" we mean to encompass a machine—whether for desktop or drafting-room use—that is a scanner, or a printer, or both (i. e., a copier), or a facsimile transceiver, or can perform any combination of these functions.

By "image media", for purposes of this document, we mean to encompass for example paper, transparency stock, and glossy media—and also, where appropriate in view of the context, articles such as books, packages and other things capable of carrying or defining an image. We further mean to encompass both:

image-bearing media (serving, in optics terms, as an "object") from which an image is to be acquired or "scanned"; and printing media or image-receiving media onto which an image is to be printed.

The phrase "swath scanner" means a scanning system that serially acquires successive swaths of a document. Such a system thus differs from a scanner of an earlier type which employs a linear detector array—fully extended across the document—to acquire entire pixel rows one at a time.

BACKGROUND OF THE INVENTION

In a pixel-based scanner, printer, copier, or FAX machine, a swath consists of a number of pixel rows, modernly on the order of twenty to two hundred. In a swath scanning system the pixel columns within each swath are serially acquired, one pixel column at a time, by an imager and detector array which move together across the document on a carriage.

We call this type of operation "carriage scanning", "swath scanning", or "swath-type scanning"—and the devices "carriage scanners", "swath scanners", or "swath-type scanners". They are also sometimes called "moving scanners".

In this document we use the phrase "full transverse row scanner", or simply "row scanner", to mean a scanner of the earlier type that acquires pixel rows one at a time. We use the phrase "pixel line" as a general term encompassing both (1) a pixel column, most typically of length equal to the swath height, in a swath scanner; and (2) a pixel row, most typically of length equal to the image width, in a row scanner. In short, as permitted by the context a pixel line may be either a pixel column or a pixel row.

(a) Row scanners generally—A scanner of this sort is generally one of three types. One is a paper-transport type, which translates the image medium past a stationary wide, shallow window that covers the receiving optics.

A second is a flatbed type which conversely moves all or part of the optical train under or over the stationary image medium—which is often positioned face-down on, and viewed through, a transparent pane. A third type takes the form of a small handheld appliance, which contains all or most of the apparatus and is moved manually over the image medium.

Most commonly all such row scanners have utilized broadband illumination—i. e., light that is nominally white—and filters or a prism to separate the resulting white-light image from the illuminated image-bearing medium into three separated-color images for either time-shared or spatially-separated detection.

A row scanner illuminates an entire row on the original object or document—entailing relatively high power and, depending on the type of light source in use, high voltages and relatively large amounts of heat. To avoid intensity fluctuation due to voltage ripple in fluorescent sources, excitation is sometimes at high frequencies—in return requiring care to avoid electromagnetic interference with high-frequency, high-impedance signals in the scanner circuits.

In such systems normally the illumination is continuous during scanning. As sensors many of these systems use charge-coupled devices (CCDs), or integrating photodiode arrays—which are periodically read out to data-transfer circuits.

CCDs, and also some integrating photodiode arrays, are sensitive to accumulated light arriving between the periodic readouts. In such systems, with continuous illumination, special provision must be made to manage this sensitivity of the detectors to the accumulation of optical energy between readouts.

(b) Color scanner with source-based color separation and sequenced sources, in a printer—U.S. Pat. No. 4,755,877 of Vollert, assigned to Siemens AG, and also the above mentioned Pat. No. 5,532,825 of Lim and Cloutier, describe use of different-color sources for color separation, and sequencing of the sources between advances from line to line. In this way they capture the full image information with color data interleaved or time-shared line by line.

Vollert in particular relies upon light-emitting diodes (LEDs) as sources. Color LEDs are available for red, green and blue—nominally the same colors as used to define standard industrial color, but not actually emitting the same spectral distributions as standard sources. In general some calculation is required to determine color constituents that would be found if the sources were actually standard.

Technically speaking it is impossible to make such a determination exactly, since sources with different spectral distribution simply do not provide all the necessary information for a full calculation. LEDs emit in relatively narrow spectral bands that peak close to the standard wavebands but can only provide a rough approximation to the standard illumination.

Also, nothing known in the desktop scanner/printer art addresses the related fundamental problem of metameric colors (see, e. g., Judd and Wyszecki, *Color in Business, Science, and Industry,* Wiley 1952, 1963, at 106 ff.). In particular it is not known in the desktop scanner/printer art how to acquire color data in such a way that a scanned and then directly printed image will have a desired color appearance under incandescent lighting, for example—or under fluorescent lamps having a particular specified phosphor mix—rather than sunlight. Again of course arithmetic adjustments can be applied, but such calculations represent an additional time-consuming step.

Lim and Cloutier introduce a new type of piggyback color row scanner. Three light sources emitting three different colors are appended with receiving optics to the output paper tray of an inkjet printer; thus this is a variant of the paper-transport scanner type mentioned above.

A subsystem is provided for selecting between scanning and printing functions. Since a single image-medium transport system is used for both functions, single-pass copying is at least awkward.

Lim and Cloutier's color row scanner interleaves color data row by row. Source types mentioned include fluorescent lamps and light-emitting diodes (LEDs) For color scanning, instead an entire image for each color could be acquired separately, in sequence. This, however, would require three passes of the image-bearing medium through the apparatus and also would introduce local misregistration arising from the flexibility of most image media.

Vollert, and Lim and Cloutier, introduce a new economy into operation of a color scanner in conjunction with inkjet printing, and teach advantageous use of source-based color separation and sequenced-source color interleaving. They do leave room for refinement as to the timing demands of CCD readout, or the detailed spectra of LED colors—or more generally the metamer problem.

(c) Swath scanners—The scanner described by Vollert is a swath scanner, not a row scanner, and it is integrated into a swath inkjet printer. At the present writing, notwithstanding the early date of the Vollert patent, scanners of this type are relatively new in the marketplace.

Other swath scanners include the Cannon model CJ-10 flatbed color copier, in which an incandescent source is carried with a sensor on a transversely-translating carriage. The source is turned on substantially continuously during operation.

In the Cannon copier the sensor is believed to be a detector-column array, scanned in two dimensions. It is not integrated with the printing mechanisms—i. e., a separate printing subsystem is used for recreating on a fresh image-receiving medium the image thus acquired.

Another swath scanner-printer that does not use inkjet technology is believed to be available commercially in Japan under the Alps brand name as "Micro Dry process" (i. e., thermal-transfer) model MD-4000J. It forms images by marking with a hot wax ribbon, and may correspond to U.S. Pat. No. 4,788,587 of Bitoh, assigned to Casio.

This device carries an incandescent bulb and a sensor on the printhead carriage. The lamp evidently is turned on continuously during operation.

The Bitoh patent describes a plug-in swath scanner that is temporarily substituted for a printhead. The device carries a cyclically indexed filter belt to interleave colors swathwise, each 16-pixel swath being 2.8 mm (1/9 inch) tall.

For color scanning the device must traverse the width of the image medium to read one color of a swath, then index the filters and recross the medium to read the next color for the same swath, and finally index again and traverse the width of the image medium yet a third time to complete the 2.8 mm swath. Thus to complete a standard page the carriage beats back and forth diligently—a total of nearly three hundred passes at the rated swath height.

Even at more modern swath dimensions the total sweep count for such a system would amount some thirty to sixty-five passes. (This accounting makes no allowance for extra passes in mitigation of mechanical inaccuracies in swath abutment—discussed shortly.) Mechanical wear in such a system is a significant consideration.

Bitoh's system requires removal and replacement of pen and sensor to print or scan—and of course to copy. His system is therefore also time-consuming and inconvenient to use, just as is the plug-in system of Carbone, U.S. Pat. No. 4,525,748.

Minor awkwardness is inherent in having to set aside a pen in an office or home desk area when the scanner is installed. Maintaining mutual cleanliness can be clumsy: workspace surfaces may be soiled by ink on the printhead, and printhead nozzles may be contaminated by various debris in the workspace.

Bitoh also mentions another effort to provide some sort of convertible scan-sensor/printhead capability in a single machine. In this regard he cites Japanese Patent Disclosure 59-32833 and Japanese Utility Model Disclosure 54-133733 for a system in which "the thermal head and the image sensor are arranged so as to be offset from a sheet, that is, they are not aligned linearly with respect to the sheet."

It can be inferred that the printhead and sensor are mounted on a carriage together but with only one at a time in operating position—i. e., the printhead/sensor must be flipped in some way as part of selection between printing and sensing. Even so, Bitoh reports that "the overall reading apparatus becomes bulky."

Thus a user of these Japanese systems may face an unsatisfactory choice between Bitoh's own inherently slow plug-in system and the undesirably bulky flip-type systems he mentions.

(d) Swath scanner-printer with read/print configuration at least partially in common, and electronics integration—The Vollert patent, and the above-mentioned application of Dobbs et al., introduce swath-type scanner-printers. The Dobbs system is a plug-in black-and-white swath scanner-printer, in which plural pens and a sensor can be carried together in their respective operating positions and orientations. It also employs a degree of integration between its sensing and printing electronics.

Dobbs et al. describe an elementary form of scanner/printer integration. In scanner operation the controlling computer, or in some operating modes the printer microprocessor itself, sends a signal to (it thinks) the nozzle-firing system of the printer.

More specifically, in scanner operation the printer is instructed to fire a particular pen nozzle. The scanner module, however, receives/intercepts and uses that print instruction to instead initiate a readout sequence for the column sensor, which is a charge-coupled device (CCD) array.

In response to this print instruction, the microprocessor collects from the CCD array the data which the array has been accumulating. Those data are, namely, the optical-brightness information for a particular pixel column—the column where the CCD array has been positioned, on-the-fly within the current swath.

Part of this data-readout process, it should be noted, is reading out a series of so-called "dummy pixels". In at least some CCD hardware the dummy pixels are present and must be read out. In some systems using CCDs, some or all dummy-pixel readout is part of a regime of CCD sequencing that is essential to accommodate the previously mentioned sensitivity of the CCDs to accumulated illumination arriving between readout cycles.

Such sensitivity as noted earlier is a characteristic of some integrating photodiode arrays, as well as CCDs. In the Dobbs and Bitoh swath scanners, and prior row scanners too, as will be recalled the light sources are turned on substantially continuously during operation.

Another even more limiting accommodation of the same interreadout cumulation—considered together with the use of light sources that are on continuously—is the need to maintain constant scanning speed. Effective sensitivity of the array varies in a complicated way with duration of the interreadout interval. Commonly the least onerous way of accounting for sensitivity variation is to stabilize this interval by controlling scan speed.

Dobbs et al. mount their sensor in place of a single pen, an arrangement which—for a multipen printer, as they point out—leaves other pens undisturbed in their carriage. Thus Dobbs teaches mounting a sensor and pens together in their respective operating positions and orientations.

Inherently one of those undisturbed pens could be a pen that prints black. In that event, black-and-white scanning and printing can proceed without unplugging anything.

This is not the case for color scanning and printing. Thus the Dobbs system represents a clear advance over Bitoh and the other Japanese disclosures, for black-and-white scanning, printing, and in particular copying—but for color work there remains the above-discussed residual awkwardness of removal and plug-in.

Vollert's system is free of these drawbacks, as it includes a sensor on the carriage in addition to the full complement of four pens. Further, Vollert reduces the number of sweeps by interleaving colors, column by column, within each swath.

Nevertheless Vollert fails to teach any way of avoiding the CCD sequencing limitations described above. Moreover, neither Vollert nor Lim and Cloutier address the spectral distribution of LED sources.

For finest match to colors determined under standard illumination, LED-acquired data require application of some arithmetic conversion, in a separate processing step. As to printing of images with a desired color appearance under various specified forms of artificial light, as well, the art fails to teach methods for avoiding additional arithmetic adjustments.

Another area that is open to refinement for both the Dobbs and Vollert systems in common, notwithstanding their superiority over prior systems, is inability to copy in a single operation. On one hand, because these systems have only a single image-medium transport system and just one carriage—both of which do double duty for both scanning and printing—these two phases of copying are very economical.

On the other hand, for the selfsame reasons they cannot be simultaneous. In other words, a piece of image medium must be fed through the machine in a first operation of the medium transport to provide an image; and then a piece of image medium must be fed through the machine in a second operation of the transport to receive the image.

(e) Single-pass swath copying—Thus for copying a document or other object, Vollert, Dobbs, Lim and Bitoh rely upon a user to provide two image-medium passes through an image-related device. Of course separate scanner and printer can be provided in a single machine, to eliminate such double-pass operation, but this response nearly doubles the cost of the main working parts and so obviates the salient benefit of sharing modules in a swath scanner/printer.

Some prior artisans have attempted to mitigate this limitation by juxtaposing twin image-medium transports to a common scan mechanism. Thus U.S. Pat. No. 4,636,871 of Takato Oi proposes intermeshed transport mechanisms for the image-bearing medium and printing medium; Oi shows multiple generic "reading/printing elements" ganged to scan together across, for each element, just a portion of the image width.

The Oi system uses multiple units of particularly costly modules—namely, sensors and printheads—but putting this drawback aside, the system also requires two transport mechanisms. This requirement is adverse in terms of cost but more importantly is very demanding of tracking accuracy as between the two mechanisms.

If paper should be only slightly misfed in either half of the medium-advance system, the resulting reproduction will have a gap, or an overprinted folded-image appearance. If the mismatch is laterally asymmetrical—a twisting of either sheet in the advance system—the result may be some combination of tapered gap and overprint.

Of course paper in any system can slip or misfeed very slightly, and in fact this does occur from time to time in every kind of printer and scanner. We are accustomed to accepting such phenomena as an unavoidable occasional incident.

The Oi system, however, essentially doubles the statistical incidence of such occurrences. This development is particularly undesirable since it doubles the likelihood that a valuable original may have to be fed through the transport mechanism more than once.

Risk of damage to a valuable original document is of course an extremely important consideration in any system which moves original documents along a paper-transport path. The Oi system thus exacerbates the handicap which a moving-original copier has inherently, relative to a stationary-flatbed copier.

That handicap includes, among other things, inability to scan or copy magazines, pamphlets, and books—even those which lie relatively flat. Pages from such materials of course can be cut out and passed through a machine, but in many or most cases this amounts to an undesirable defacing or destruction of the full original book etc.

In some ways this handicap is even greater for copying of small or irregular pieces of image medium. Such originals include for example product labels and book jackets, compact-disc faces, envelopes, pieces of shipping packages, credit cards, business cards and Rolodex® or index cards, cash-register tapes, checks, and notepad sheets—and myriad other items not readily passed through most document-transport-type machines.

U.S. Pat. No. 5,162,916 of Stemmle et al. discloses a very compact, portable scanner/printer/copier—which employs an arrangement similar to that of Oi's system, as to advance of the two image media. Stemmle's two sheets are driven lengthwise above and below common drive rollers, with idlers above and below for maintaining engagement to the common drive rollers.

The same misfeed or slippage problem mentioned above as to Oi's patent remains in any such dual system. Stemmle's, however, is particularly objectionable in that his two image-medium sheets must travel in opposite directions at the same time.

The distinctly unbusinesslike appearance of such operation may be excused in a portable apparatus, and the requirement that Stemmle's apparatus must invert (with respect to the medium-advance direction) each pixel column in preparation for printing is not onerous. Nevertheless several practical drawbacks arise.

First, the two sheets of image media extend in opposite directions from the apparatus, with the original image being read facing down and the image being printed facing up. Thus the trailing edge of the original tends to drag over the leading edge of the new copy, running the risk of not only smearing the copy but also soiling the original.

This result may be disastrous if the original is a valuable document. If this system were applied in a color copying context, where relatively large quantities of liquid inks are deposited in a short time, the likelihood of damaging both documents would be particularly high, but even in black-and-white machines it is a serious concern.

Furthermore the tabletop space required by the apparatus and sheets of image media in use is somewhat longer than twice the length of a sheet of image medium. Most swath-printing machines that employ printing-medium-transport systems are only about one and a half times the length of a sheet, by virtue of curved paths for the printing medium, and this should be considered at least a goal for swath-based copiers too.

In addition the task of the user in feeding two sheets of material into the apparatus, straight, from two different directions is quite awkward. This may be mitigated somewhat by making access to the machine available at both sides of the supporting table etc.

These constraints may be problematic even in some portable-device environments. The configuration is inapposite to office or home contexts, where the economy of the basic machine is offset by floor-space and office-layout demands.

Stemmle attempts to ameliorate these limitations in his U.S. Pat. No. 5,032,922. Here the same basic device, rather than simply resting on a tabletop, is ingeniously mounted slothlike to cling to and crawl along the underside of a transparent rectangular platen. The platen is raised, by legs at its four corners, above the table.

The platen beneficially separates the original from the newly inked copy, and also enables copying of books, odd-sized documents and other objects. Potential for relative misfeed, however, remains as the copy paper is fed through the unit by a partially separate mechanism.

This potential problem is aggravated by retention of the oppositely directed paths of the platen and the printing medium, with respect to the printing apparatus itself. In this context, since the platen is stationary, the copy is ejected ahead of the traveling copier module, but traveling at double speed in the same direction as the absolute motion of the copier module relative to the table.

Due to these unfavorable relationships, it appears that the forward edge of the emerging sheet is vulnerable to being slowed or stopped by any roughness or obstacle on the table or other support. If such obstruction is only slight, it can slightly curl the printing medium in the print zone, within the copier, leading to erratic distortions of the image being formed.

If obstruction is more severe (as for instance on a cloth-covered table, or a table with other articles under the platen), the leading edge of the medium could curl back under the copier module. In this case it would be dragged inked-face-down along the support surface.

Yet another related Stemmle design appears in U.S. Pat. No. 4,920,421. The configurations discussed above may have evolved from that discussed in the '421 patent, which is a desktop model with a stationary transparent platen on a case.

Under the platen the document sensor and printhead ride together in a transversely scanning carriage, which in turn is on a gantry that also steps longitudinally. As in the '922 patent, the printing medium is ejected at double speed forward—but now safely within the case, and deposited into an output tray just at one end of the case.

This configuration too has dual motion in the advance axis: the gantry steps along under the stationary platen, and the printing medium moves through a transport mechanism on the gantry. In other words—within the common, moving inertial frame of the gantry, printhead and scan sensor—the input-document platen translates in one direction and the print medium in an opposite direction.

(f) Auxiliary print functions—The Cobbs and Sievert patent documents mentioned earlier teach use of an optical sensor and associated light source mounted with inkjet pens on a transversely operated carriage. The sensor is for use in calibrating the pens with regard to their mutual alignments in both the transverse ("scan") axis and longitudinal ("medium advance") axis.

A sensor is advantageously used on an inkjet carriage for other auxiliary functions too. These include determining whether ink supply is in need of replenishment, ascertaining the quality of printing, and locating the edge of a piece of printing medium.

As will be seen, all these functions are compatible with the teachings of the present invention. At the same time, however, it is important to clearly distinguish all such sensor uses from the present invention.

For many of these auxiliary functions, optical or spectral constraints—or both—imposed on the sensor and light sources are far less demanding than in a scanner. In most cases these modules operate on a monochrome basis, and with substantially d. c. illumination.

Swath scanners heretofore have not been associated with auxiliary print functions.

(g) The technology of print modes—In swath printing the phrase "print mode" usually refers to a particular pattern of pixels into which inking is divided, as between two or more traverses of the carriage. Print modes and so-called "masks" used in implementing them have been very highly elaborated, to serve a variety of causes.

Some print modes help to control development of excess undried liquid ink, highly localized on a printing medium at any given time. This is particularly useful with media that can absorb relatively little liquid.

Other print modes help to camouflage adverse visual effects of heating (also used to accelerate drying), or the effects of operating very near an end of the printing medium—where the advance mechanism cannot control position as well as elsewhere. Still other print modes are aimed at concealing the edges of swaths—or color shifts between swaths laid down during scanning in opposite directions—to avoid a horizontal banded appearance To avoid such horizontal banding, and sometimes to minimize generation of moire patterns, a print mode may be constructed so that the paper advances by a fraction of a swath height between each initial-swath scan of the pen and a corresponding fill-swath scan or scans. In fact this can be done in such a way that each pen scan functions in part as an initial-swath scan (for one portion of the printing medium) and in part as a fill-swath scan.

Such techniques tend to distribute—rather than accumulate—print-mechanism error that is impossible or expensive to reduce. The result is to minimize the conspicuousness of, or in simpler terms to hide, the error at minimal cost.

Previously mentioned patent documents of Nicoloff, Hickman and particularly Cleveland survey in greater detail many uses of print modes. The Cleveland document in particular explains concepts such as "space rotation" and "sweep rotation".

These are different ways of changing the print-mode pattern or mask by shifting individual nozzle commands in each pass—or by using different patterns in different portions of the nozzle array. In addition, as Cleveland also explains, operating parameters can be selected in such a way that, in effect, rotation occurs even though the pen pattern is consistent over the whole pen array and is never changed between passes. Figuratively speaking this can be regarded as "automatic" rotation or simply "autorotation".

Heretofore the use of print modes has not been associated with scanners.

(h) Media and form identification—In both printing and scanning work for various reasons it is desirable to be able to verify automatically the character of the image medium. In printing, for example, the medium itself determines ideal inking patterns for best color appearance (saturation, color balance etc.), and also for application of related control regimens such as heating to hasten ink drying, or special end-of-page print modes to accommodate distortion that in turn results from heating.

In scanning, if the medium includes a preprinted form into which data have been typewritten, confirmation that a form is present—and identification of the specific form and its alignment—determine how the data should be interpreted, stored or reprinted. Similarly if data are to be used to fill in a new form, confirmation of the identity and alignment of the form determines how the data should be formatted for entry.

Although such automated identifications of media and forms are of considerable interest, little work along these lines has appeared in the swath-printer marketplace.

(i) Mirror images—For artistic effects and possibly for other reasons it is sometimes desirable to be able to make a mirror image of a given input object. Many graphics programs for use in computers provide for such reversals. Such mirror imaging is easily implemented electronically or in firmware.

Stemmle, for example, as mentioned above must invert each pixel column before reassembling adjacent swaths, to accommodate the oppositely directed movement of his original and copy. His apparatus performs the inversion by reading back pixels within each column in a sequence opposite to that used in the scanning stage. Such inversion is readily accomplished either in terms of firmware or in terms of direct control of a shift register.

Stemmle neglects to mention that if he did not perform this inversion each output swath, considered individually, would be a mirror image of the corresponding input swath. Since Stemmle's image-medium sheets are traveling in opposite directions, however, the overall image would not be as seen in a mirror but rather would be scrambled.

We are not aware of any scanner/printer/copier offering provision of mirror images, without intervention by an associated computer. Where mirror imaging is desired such a feature would be helpful, to save time and resources.

(j) Conclusion—Many above-discussed limitations of the related art have continued to impede achievement of uniformly excellent scanning and/or printing. These include unavailability of single-pass copying in practical form, for the most highly economical systems—and the failure to take advantage of pixel-masking techniques, integrate auxiliary functions or make mirror images.

Even the Vollert, Lim and Dobbs systems continue to contend with the fussy timing (and "dummy pixel") demands of CCD readouts, and for finest results a need for arithmetic adjustments to bring color signals into conformance with industry standards. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is an image-related device for producing a signal array that corresponds to an image of an input object. The image-related device includes a detector for generating such a signal array in response to patterns of received light.

In addition the device includes some means for illuminating at least a portion of such object. For purposes of breadth and generality in discussing our invention, we shall refer to these means as the "illuminating means".

The device further includes some means for placing on the detector light from an illuminated portion of such object. Again for generality and breadth, we shall call these means the "placing means".

For purposes of this document, these "placing means" may take any of various forms. For example, an imager may be used to form on the detector an image of part of the object; in such case the placing means include the imager. Alternatively the system may employ a detector or sensor of the contact type; in this case the placing means may be considered to include the mounting arrangements whereby a contact detector is positioned closely adjacent to the document or other object.

In addition the device includes some means for pulsing the illuminating means. Here again, for generality we shall denominate these the "pulsing means". The pulsing means in turn include some means for differently setting the durations of light pulses of different colors, respectively, to control color balance.

The foregoing may constitute a description or definition of the first facet of the invention in its broadest or most general form. Even in this general form, however, it can be seen that this aspect of the invention significantly mitigates the difficulties left unresolved in the art.

In particular, adjusting illumination pulse lengths to control color produces important advantages. First, the departure of LED or other pulsed-source spectral distributions from standard source distributions can be greatly diminished in importance.

In other words, color data (and therefore resulting reproductions made using those data) can be corrected for the odd spectral properties of the LEDs etc. This statement implies of course that a particular illumination will be used for viewing the reproduction.

Furthermore, printing can be adjusted for desired color appearance under a variety of different assumed lighting conditions. For example, a set of colored charts or the like to be presented in a conference room with incandescent spotlights may be printed differently from the same charts for presentation under fluorescent lights, or differently still from the same charts for presentation in daylight.

Since LED spectral distributions are typically emission lines, though possibly complicated multiline spectra, it may not be possible to produce fine-tuned color adjustments closely coordinated with the color sensitivity spectra of the eye. Relatively coarse or preliminary color adjustments, however, are contemplated.

The significance of this feature is that these benefits are obtained merely by a simple setting of the pulse durations, without arithmetic conversion from one color space to another. This pulse-width modulation (PWM) of color balance, or color control, thus saves computational steps.

A second aspect of the invention is an image-related device which includes some means for illuminating at least a portion of an input object with light pulses at intervals. Again for generality these means will be called the "pulsed illumination means".

Also included in the device is a time-integrating detector for generating a signal array in response to patterns of received light. Furthermore the device has some means for placing on the time-integrating detector light from an illuminated portion of the object, so that the signal array represents the object visually—once again, "placing means".

The device also has "selecting means", which select, at a variable scan velocity, successive portions of the input object for placing by the placing means on the time-integrating detector. In addition the device includes some means—"reading means"—means for reading signals from the detector at intervals to develop the signal array.

The device of this second aspect of the invention further includes some means for synchronizing both the pulsed illumination means and the reading means with the selecting means. These we call the "synchronizing means".

In such a system, the variable scan velocity causes the reading intervals to vary. This device, however, includes substantially no means for adjusting amplitude of signals from the detector to compensate for variations in the variable scan velocity.

In this regard we use the phrase "substantially no" to cover not only systems that include no compensation at all, but also systems that make use of token or unnecessary compensations. Such token provisions might otherwise be included merely in an effort to circumvent certain of the appended claims.

The foregoing may constitute a description or definition of the second facet of the invention in its broadest or most general form. Even in this general form, however, it can be seen that this aspect of the invention too significantly mitigates the difficulties left unresolved in the art.

In working with any cumulative detector—such as a CCD or integrating photodiode—whose sensitivity varies with intervals between readout cycles, pulsed illumination can be used to define the accumulation interval. This pulsing function must go a step beyond the sequencing taught by Lim or the simple "pulsing", as such, mentioned by Vollert.

In particular while the term pulsing might be considered to encompass turning off each color source when turning on the next color source in order. Such a procedure, however, can create substantially continuous illumination which fails to resolve the sequencing problems described earlier.

For this reason we prefer to set the nominal pulse intervals so that the total exposure time for all colors is significantly shorter than the total time available for each pixel. Dark intervals can then be provided between the light pulses of different colors. For definiteness such timing may be described as "underpulsing".

This condition should be established for the fastest scan speed anticipated during operation, so that it can be satisfied regardless of speed variation. This condition should also be established to leave time in the pixel-based cycle for other variations such as PWM color correction—as mentioned in connection with the first aspect of the invention.

Suitable control of ambient light or other stray light is also required to implement this strategy. Normally such control is readily made adequate in an ordinary scanner or printer case, and we prefer to provide such control.

Through suitable underpulsing of the illumination the effective sensitivity of the detector is rendered substantially independent of extraneous factors such as scan speed. By pulsing the illumination in synchronization with positional information, light accumulation intervals are established at precisely the locations (i. e., positional ranges) where pixel locations are desired.

A system designer is thus left free to make best use of varying scan speed in the apparatus. Ramp-up and ramp-down portions of the transverse scan can be included, as can great latitude in control of scan speed even during data acquisition, without adversely influencing the data.

Although this second aspect of the invention in its broad form thus represents a significant advance in the art, it is preferably practiced in conjunction with certain other features or characteristics that further enhance enjoyment of overall benefits.

We prefer to integrate this second aspect of our invention with a printer, and particularly a printer that employs a common carriage to hold the detector and a printing pen. As will shortly be seen we have numerous other preferences that maximize enjoyment of the full benefits of our invention.

In a third basic aspect or facet, the invention is an image-related device that includes a substantially unitary detector for generating a signal array in response to patterns of received visible and invisible radiation. The device also includes some means for illuminating at least a portion of an object with visible radiation of plural colors or with invisible radiation.

Further the device includes selection means for actuating the illuminating means. The selection means cause the illuminating means to provide either the visible radiation or the invisible radiation selectively.

In addition the device includes means for placing on the detector radiation from an illuminated portion of the object, so that at least part of the signal array represents the object visually. Accordingly the detector selectively generates a signal array in response to visible or invisible indicia of the object, respectively.

This third aspect of the invention accordingly serves as a tool for reading not only visible indicia such as visible colors, patterns etc. as normally thought of in conjunction with scanning and printing—but also invisible indicia. The latter indicia can be preapplied to identify printing media of various types, or to identify preprinted forms to be scanned for data already entered in the forms, or to identify preprinted forms into which data are to be printed—all without cluttering the form or media visibly.

Available sensors respond well to certain invisible radiation, such as infrared light at e. g. one micron, as well as to all visible colors. Thus a single sensor can be used for both purposes, and we prefer to do so.

Infrared LEDs can supply the invisible light. Suitable inks that absorb in only the infrared can be used to imprint invisible indicia for reading by the sensor when suitably illuminated—to identify media type, or a form, etc.

In preferred embodiments of a fourth of its aspects, the invention is an image-related device which includes a detector for generating a signal array in response to patterns of received light, and some means for illuminating at least a portion of an object.

The device also has means for placing on the detector light from an illuminated portion of the object so that the signal array represents the object visually, and pen means for applying the signal array to print an image of the object on a printing medium. Further the device includes means for using the same detector array to perform at least one of these auxiliary printing functions:

determining whether the pen means are out of ink, or whether ink is running low,
determining the quality of printing by the pen means, in particular closing a color-quality control loop,
if the pen means comprise plural pens, determining the mutual alignment of the pens, and
locating the edge of the printing medium, generally concurrently with printing thereon.

This fourth aspect of the invention is advantageous in causing the sensor in the device to do double duty as both a scanner sensor for acquiring an image, and an auxiliary-printing-function sensor for optimizing and refining the operation of the printer stage of the device.

In systems which acquire an image from an image-bearing medium disposed in one direction from a carriage, and print an image on a printing medium disposed in a different direction from the same carriage, we prefer that the device include means for selecting the direction from which the detector receives light. These selecting means can take a variety of forms as will be indicated later.

In a fifth of its primary facets or aspects, the invention is an image related device for producing a signal array that corresponds to an image of an input object. The device in this case includes some means for acquiring a subarray of signals corresponding to a swath of such object—the "acquiring means".

The device also includes some means for sequentially defining different swaths for processing by the acquiring means. These "defining means" operate to produce a signal array as a sequence of the subarrays.

Further included are some means for controlling the defining means so that successive swaths overlap. This facet of our invention enables enjoyment, in a swath-scanning context, of all the many benefits of the well-developed print-mode technology discussed earlier.

We prefer to fashion "scan modes", as they may now be called, for various purposes such as reducing conspicuousness of medium-advance imperfections. Thus linear sequences of pixel patterns oriented at a shallow angle to the advance axis can be helpful in certain circumstances.

Rotation of scan-mode masks without concurrent provision of any medium advance can be helpful near an end of an object being scanned, where the mechanics of image-medium advance are particularly subject to error. Advance of the image medium by steps that are an odd submultiple of a swath height—e. g., $\frac{1}{3}$ or $\frac{1}{5}$—and/or in conjunction with scan-mask densities of like fractions of unity, can also be useful.

Such fractional advances and densities in particular may be employed, for some types of objects, to prepare an input signal array that is, in effect, preconditioned for use in printing by an integrated inkjet printer stage. Advantageously the scanner shares mechanical, electronic and software subsystems of such a printer: all such integrations are particularly beneficial in nearly halving the cost of scanner and printer functions considered alone.

In preferred embodiments of a sixth of its aspects, the invention is an image-related device. The device includes a swath scanner for generating a signal array by mechanically scanning a sensor across an input object, to acquire successive pixel columns of a pixel swath of the object.

The device also includes a swath printer for printing an image from the signal array by mechanically scanning pen means across a printing medium. The result is to print successive pixel columns of a pixel swath of the object.

In addition the device includes some means for electronically reversing the order of acquired pixel columns, in the signal array. These reversed-order columns, in the array, are for use by the swath printer in printing successive columns of the swath.

As will be recalled, the Stemmle patents call for inversion of individual-pixel order, within each column of each swath. We instead reverse the order of the columns, and thereby gain several important advantages.

The foregoing may be a description or definition of the sixth main facet of the invention in its general form. Even as thus couched, however, this aspect of the invention is particularly useful as it enables use of certain particularly favorable geometries.

We accordingly prefer to employ this aspect of the invention in conjunction with such geometries. In particular we prefer that the swath scanner and swath printer share a common, substantially unitary carriage, for scanning the sensor and pen means together. This scanning action takes place along a scan axis across the object and the printing medium.

The carriage undergoes relative motion with the object—or, to say the same thing in another way, undergoes motion relative to the object. This relative motion is along an advance axis which is orthogonal to the scan axis.

Moreover the carriage undergoes relative motion with the printing medium, along the same advance axis. Along the advance axis, the carriage motion relative to the object and the printing medium is in a common direction.

This preferred geometry thus differs from that in the Stemmle patents, where the relative motions of the carriage with respect to the object and the printing medium are in opposite directions. Our use of common relative motion for both the object and the medium is made possible by the electronic reversal of pixel-column order.

As will be seen, we also prefer that the object and printing medium in fact remain stationary, all motion being provided by the carriage and a gantry which translates the carriage along the advance axis. In the preferred form of this aspect of the invention, the object and medium are held stationary and parallel to each other—but spaced apart.

Preferably the carriage and gantry operate in the space between the object and medium. This dual-flatbed arrangement eliminates the objectionable characteristics of the Stemmle configurations, providing instead a very stable and orderly operation based upon only a single pass of one single advance mechanism. Bidirectional scanning is possible as will be explained.

A seventh aspect of the invention is closely related to preferred embodiments of the sixth aspect. The main difference is that no electronic reversal is provided, and the apparatus instead prints mirror images.

All of the foregoing operational principles and advantages of the present invention will be more fully appreciated upon consideration of the following detailed description, with reference to the appended drawings, of which:

BRIEF DESCRIPTION OF THE DRAWINGS

FIG. 12 is a timing diagram illustrating so-called "last-in/first-out" or "LIFO" pixel-column reversal within each swath;

FIG. 15 is a timing diagram analogous to FIG. 12 but instead showing FIFO column playback for use in generation of mirror images;

DETAILED DESCRIPTION OF THE PREFERRED EMBODIMENTS

Figure 1:
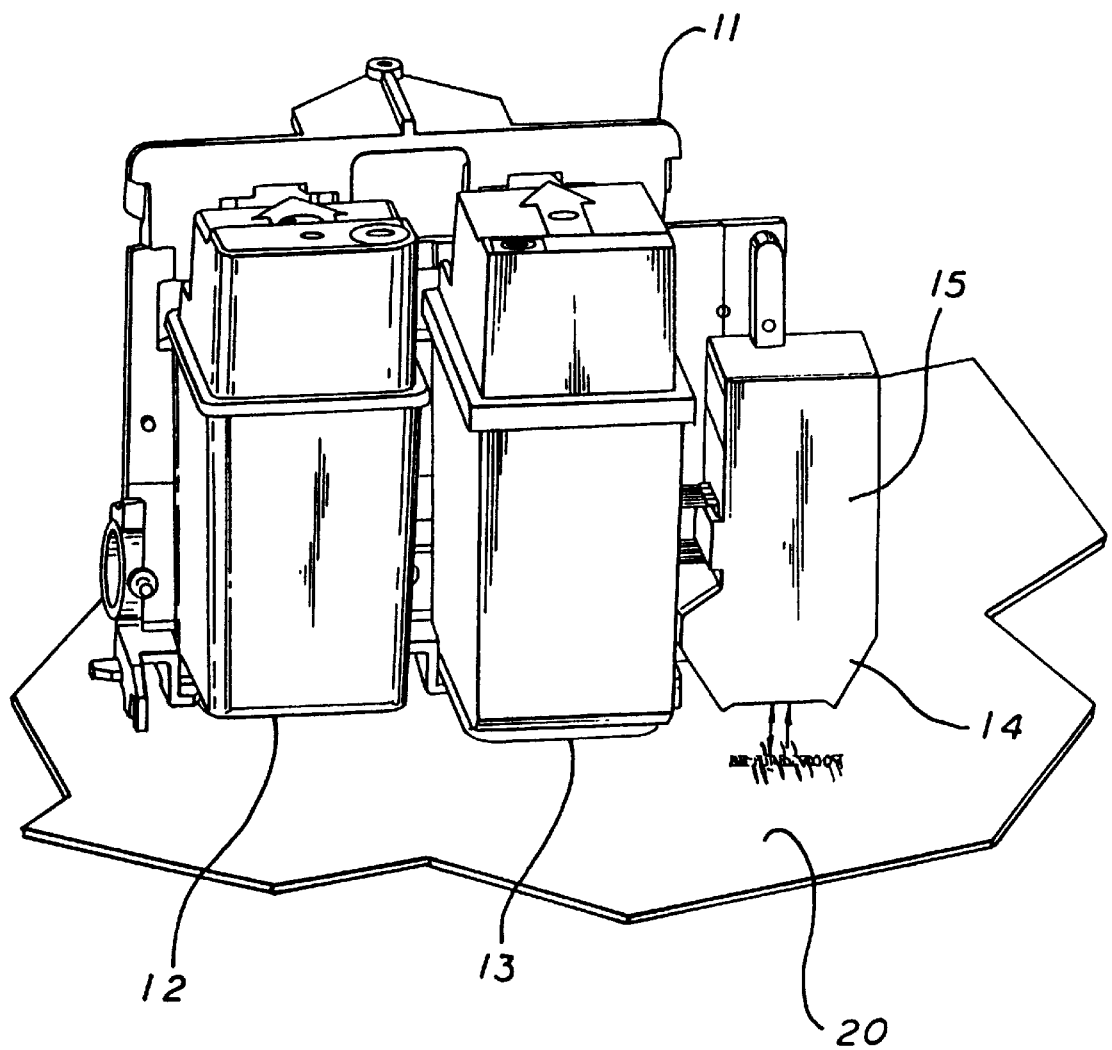
FIG. 1 is a front elevation of a preferred embodiment of portions of a swath scanner, according to the invention, including a carriage that holds two pens, and also holds a sensor assembly with its cover in place.

The present invention is a scanning system generally intended for use in a scanner; however, it may also be used in a printer, copier, FAX machine, or other related device. Preferred embodiments of the invention may be advantageously incorporated into a device having a carriage 11 (FIG. 1) such as typically associated with an automatic printer, as for instance a thermal-inkjet desktop printer.

This combination is a particularly powerful one, since much of the necessary mechanics, electronics and firmware for scanning are already present in such a printer. Scanning functions therefore can be added at extremely modest direct cost.

The carriage 11 holds a black pen cartridge 12 and a color pen cartridge 13. Also securely mounted to the carriage 11 is a sensor assembly 14, shown with its cover 15 in place.

Figure 2:
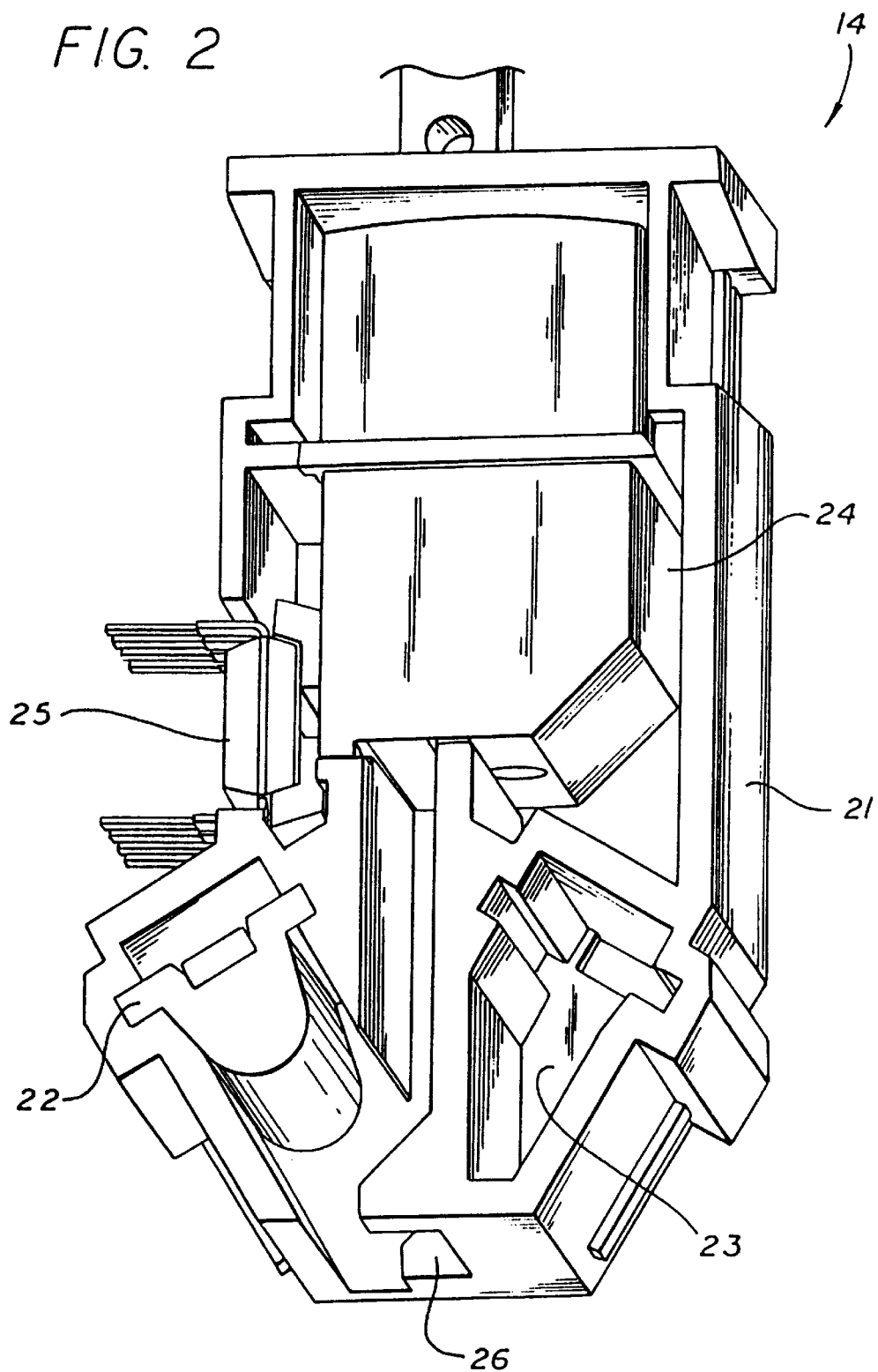
FIG. 2 is a front elevation of the sensor assembly of FIG. 1 with its cover removed.

Internal elements of the sensor assembly 14 include a housing 21 (FIG. 2) with at least four bays 23 (only two of which are visible in the illustration) for holding light-emitting diodes (LEDs) 22. An LED 22 should be installed in each of the four bays 23.

For this purpose, in the case of color operation, the four LEDs 22 selected for use should be capable of emitting respectively in each of four different spectral bands—e. g. red, green, blue and infrared—sufficient for constructing color information, and also for providing response to invisible indicia preprinted on image media.

As is well known in the art, the spectral content of emissions in each of the visible bands preferably satisfies certain constraints. More specifically the spectral content should be such as to enable extraction of color information which is comparable with standard industrial specifications of color, or at least approximately transformable into such standard specs. For these purposes in particular we have initially used very bright red-, green- and blue-emitting diodes from Nichia.

The housing 21 also has a channel 26 for passage of incoming light from a document 20 or other object below the assembly 14. Mounted in the housing 21 is an imager 24, shown here in the form of a solid optical block whose surfaces define curved internal mirrors and a planar folding mirror.

A short optical path and limited field of view, as suggested in the drawing, enable us to use for the imager a telecentric optical system. This kind of system eliminates the distorting effects of variable magnification due to mechanical tolerances in the system—and also due to contours or deformation (e. g., curling or wrinkling) in an image medium or other type of object 20 being read.

Unity magnification in such an optical system also relaxes the requirement on optical-sensor feature size. This allows use of a sensor array of, for example, one hundred elements spaced at about 0.08 mm (0.0033 inch) along the advance axis—rather than a representative 0.016 mm (0.0005 inch) spacing for a page-wide CCD array of 2500 or more elements. The hundred-element sensing device is smaller but can have more features integrated into it than is possible with a CCD.

Such an optical system can also be made to minimize variable resolution, brightness and chromatic effects over the swath height, which would otherwise lead to noticeable banding in the resulting image. The solid-block embodiment with a folding mirror is merely one of several embodiments which can effectively function within the sensor assembly 14.

The housing 21 further contains a detector array 25. The imager 24 is positioned to receive light, through a channel 26, from the document being scanned and to direct the light toward the detector array 25.

In this embodiment the imager forms, at the detector array 25, an image of document objects located in the imager's field of view. The detector array 25 responds to the light it receives by producing a corresponding array of electrical signals—which it forwards to system electronics or firmware for storage, processing and use.

This simple combination of multicolored LEDs with a monochrome sensor has been found to be an extremely powerful tool. Additional specifics as to the imager are presented in the previously mentioned copending application of Jack H. Schmidt.

In principle the imager 24 and detector array 25 together might be replaced by a contact sensor of a type that is juxtaposed directly to the object 20. Such a substitution would require managing the illumination, positional variations in the material of the document or other object 20, and like practical considerations.

Figures 1, 3:
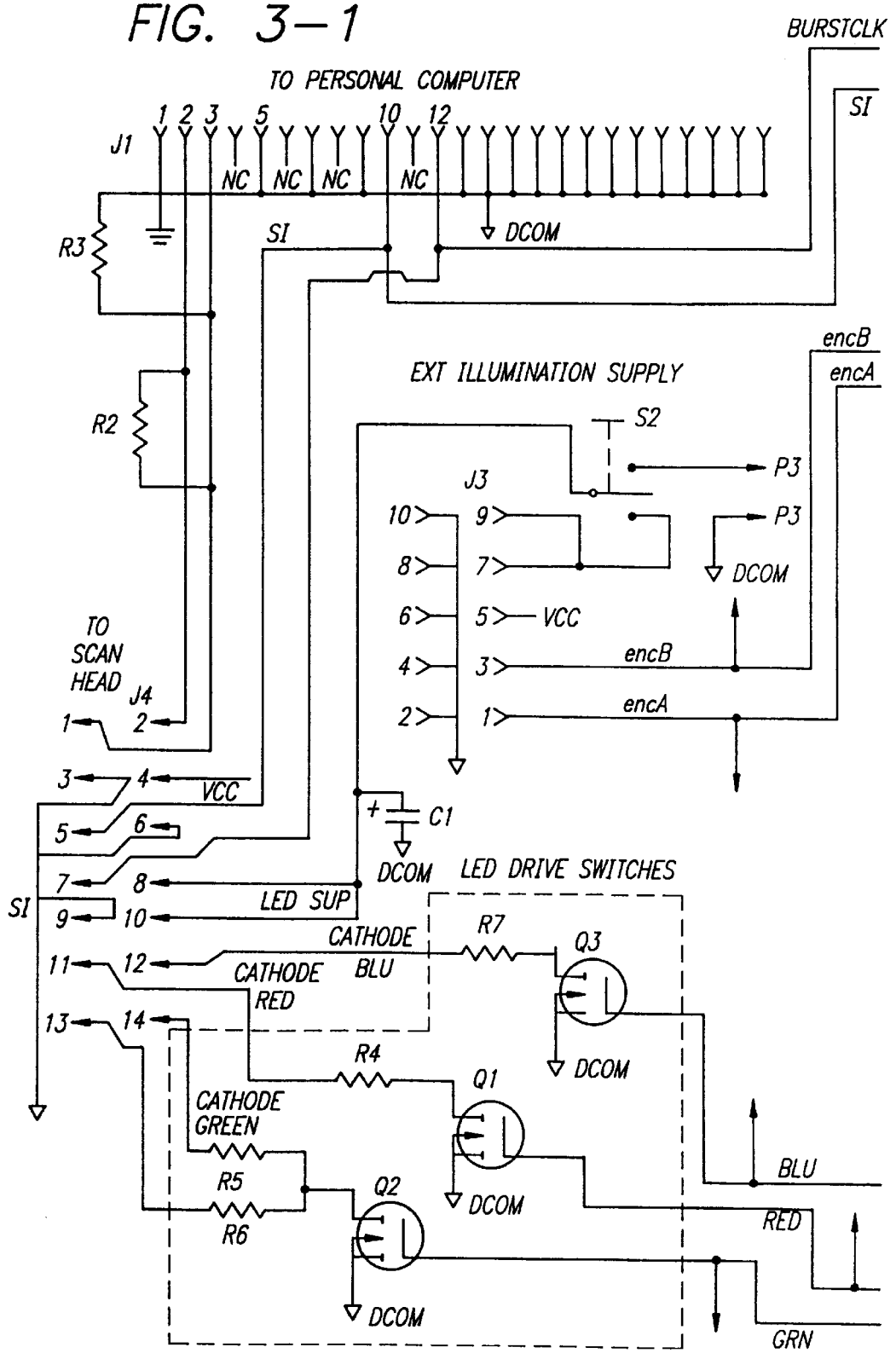
FIG. 3 is an electronic schematic showing a representative circuit which we have used in development of the invention, particularly suited to an embodiment taking the form of a swath scanner as in FIGS. 1 and 2 but also providing a tutorial function with respect to row scanners such as are discussed below.
Figures 2, 3:
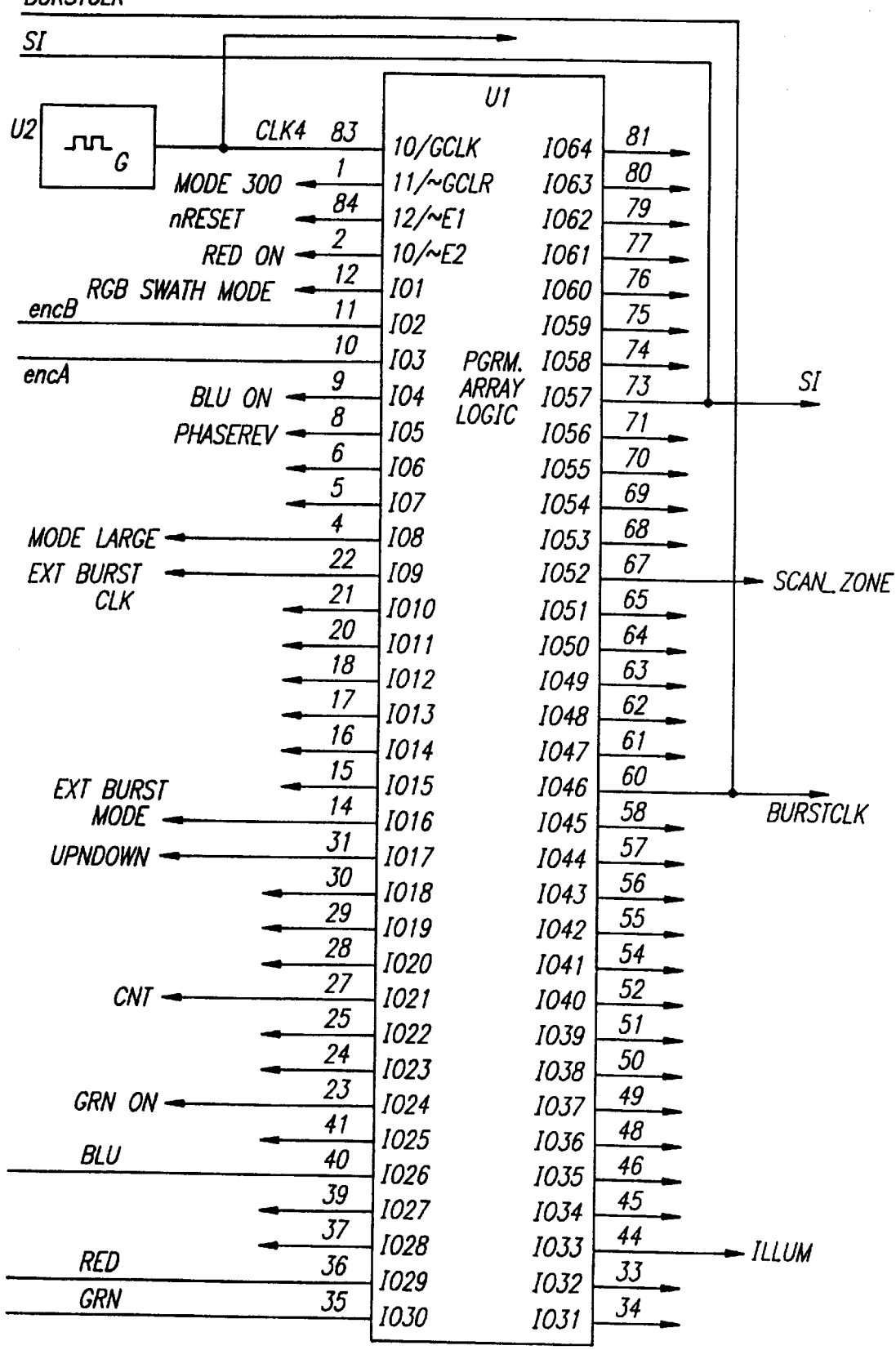
Figure 3:
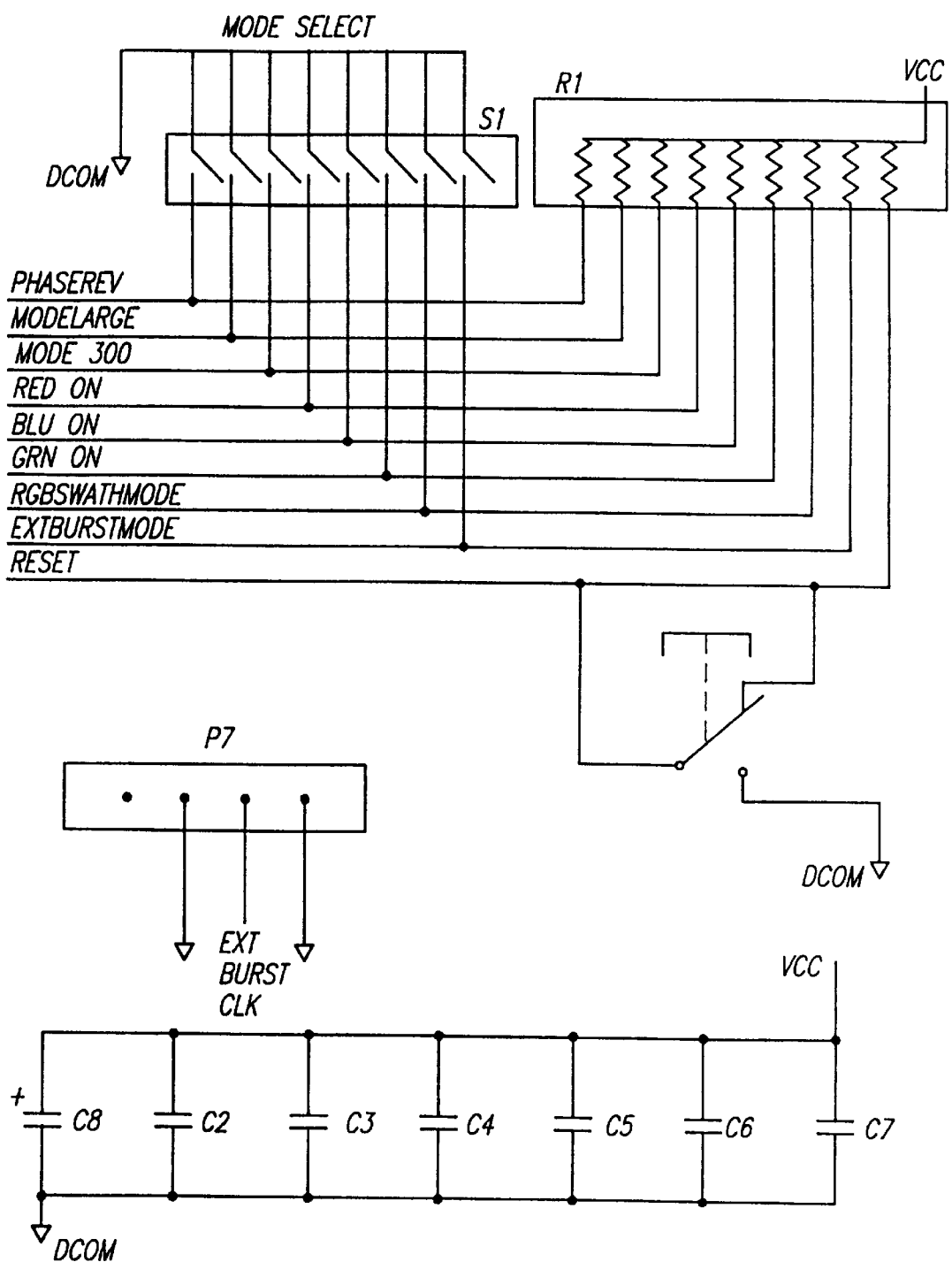
Figure 11:
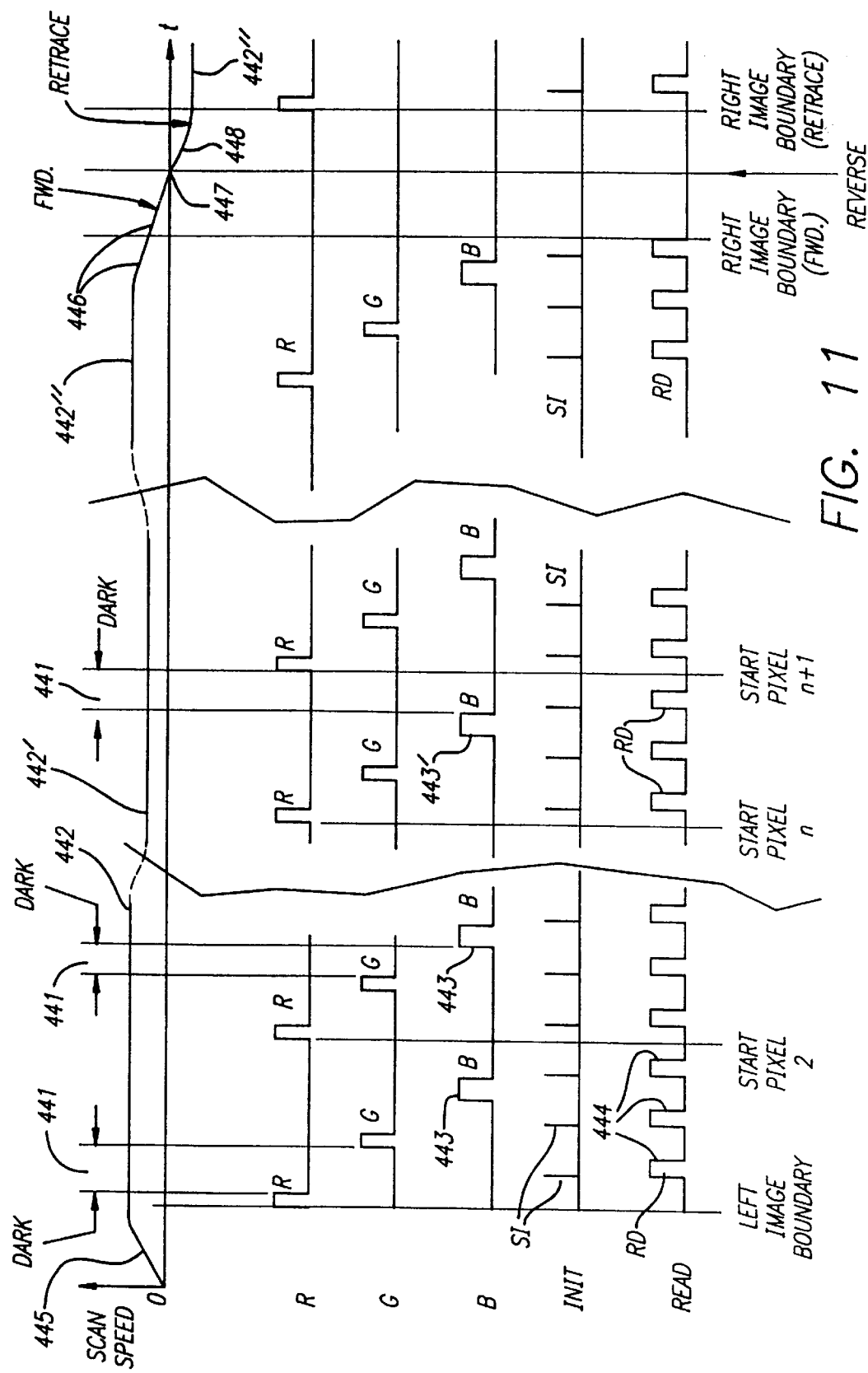
FIG. 11 is a timing diagram illustrating underpulsing and PWM color control.

Use of LEDs of three colors enables the illumination system to be extremely inexpensive but also enables pulsing of the illumination at controlled, extraordinarily brief durations and intervals. Controlling (FIGS. 3 and 11) the light sources in short, high-intensity pulses provides a known time integral of illumination for each sensor readout cycle.

Power required for the LEDs is much less than required for any other type of illumination. For prototype work the entire scanner control timing was easily implemented in a field-programmable gate array (FPGA) and added into a low-cost printer mechanism.

By exploiting the pulse capability of the LEDs, our invention is able to scan at different carriage rates including ramp-up and ramp-down speeds. This ability to scan accurately, relying on an encoder strip to synchronize the position of the scanner samples, makes high-quality scanning possible with very low-cost mechanics controlling the motion.

A typical inkjet printer carriage has velocity variations that can be up to ten percent of the average velocity. These variations are also correlated from swath to swath, because of friction anomalies along the traverse mechanism.

In a scanner if uncorrected these vertically correlated velocity variations would lead to very conspicuous striations in the output image We have verified this in experiment by operating our system with the underpulsing circuit disabled, or set to eliminate the dark intervals between pulses of different colors, and thereby to provide continuing illumination.

In a conventional inkjet printer such velocity variations are immaterial because firing position is controlled by reference to the position encoder rather than solely by time. Use of pulsed LEDs enables enjoyment of this same advantage in a scanner.

We supply the illumination in bursts shorter than the shortest expected readout interval (e. g., the desired pixel width divided by the fastest expected velocity—and also divided by the number of different colors, including infrared). We synchronize these bursts, and the readout clocking of the sensor device as well, with the encoder-determined carriage position. As a result we have achieved high-quality, repeatable scanning using a very inexpensive mechanical device with many loose functional tolerances.

Pulsed illumination has still another advantage. A scanner system that depends exclusively upon elapsed time for defining readout timing is vulnerable to development of a geometrical skewing of the effective line of the sensor array, particularly if the detector data are shifted out of the detector serially.

In other words, such an array may undesirably collect data representing a group of pixel positions along an angled or even curved line, rather than the ideal vertical straight line. By timing each illumination burst to start only after all elements have been read out and reset, we can eliminate such a skew effect—and so enlarge our selection of useful detector types.

This system was first implemented in prototype using a TSL401 or TSL1301 sensor from Texas Instruments. That sensor is a photodiode array of 128 elements, operating from a five-volt supply.

This sensor requires an "init" (initialization) pulse at its terminal SI, followed by 128 clock pulses to transfer the outputs of all the sensing elements to the single output pin. This sensor is a monochrome device, with element spacing at 32 pixels/mm (400 pixels/inch).

To install it for testing in an existing inkjet printer, we tapped the two position-encoder lines that carry twin position signals in quadrature, and the +5 V and +21 V pen power, and commandeered some lines from the pen-carriage trailing cable to use for the sensor control, power, and output signals. We mounted the sensor on an optical unit that was installed on the pen carriage.

This optical module contained optics to image the document onto the sensor, and mounts for securing LEDs near the document. A total of sixteen surface-mount LEDs were mounted in two groups: four red, four blue, and eight green.

These were powered by the main pen supply through series current-limiting resistors and three 2N7000 MOSFET transistors. We programmed a field-programmable gate array (FPGA) to decode the two-phase linear encoder on the printer, appying the resulting decoded position signals to feed an up/down position counter in the FPGA.

The sign bit of this counter is used to indicate the scan zone. When the carriage is positioned at the beginning of the scan zone and the counter is reset, the FPGA proceeds automatically to operate the LEDs and debrief the sensor.

As the carriage starts across the image medium and the sign bit of the position counter changes to indicate the carriage is in the scan zone, a state machine goes from an idle state to a state that generates the SI pulse to initialize the TSL401 or TSL1301 sensor. When the sensor is thus cocked, it outputs pixel data on each subsequent clock pulse.

The state machine then generates 128 such clock pulses at a 1 MHz rate output the data to output the data to an A/D converter printed-circuit assembly in a personal computer. These clocks also advance the data into a MetraByte™ A/D board in the computer.

After the data are all collected, the state machine turns on the illumination for a nominal 272 $\mu$sec—subject to the PWM considerations previously discussed. The pulse duration is also subject to various basic system design parameters, particularly including the maximum contemplated scan speed.

When the illumination interval is complete, the state machine idles until the second 24 pixel/mm (600 pixel/inch) encoder edge occurs—scanning at 12 pixels/mm. This causes the cycle to repeat, while the carriage is in the scan zone.

At its nominal velocity the carriage takes about 500 $\mu$sec to cover $\frac{1}{12}$ mm ($\frac{1}{300}$ inch). The state machine is busy with the procedure just described for about 400 $\mu$sec, leaving a nominal 100 $\mu$sec for dark intervals. Thus to avoid timing overlap the carriage has an upper velocity limit of twenty-five percent faster than the nominal.

For testing purposes we set up the A/D card to capture a desired number of columns per swath, and then stop and return. The state machine continues during carriage retrace until the position counter indicates that the carriage has left the scan zone.

This system is readily adapted to take data on retrace as well, thus enabling bidirectional scanning. This operational mode is slightly more complicated, since the retrace period is no longer available exclusively for unloading of the A/D card and processing the swath data.

As will be seen later, however, for some preferred forms of swath copier it is only necessary to cache data from one or a very small number of swaths, for prompt reproduction by the printing stage.

Color sequencing of the system is also established by the state machine. It has two different illumination-control modes.

In one of these, illumination color is changed each time the carriage enters the scan zone—so that the scanner is operated by making three passes, one for each color, and then advancing the media by one swath (or subswath) height. In the second mode the colors are cycled for each column of the swath—i. e., pulsing all three visible-color LEDs in series at each pixel column—resulting in storage of image data with column-interleaved colors, red-blue-green/red-blue-green etc.

This image, in our prototype system, is on a coarser pixel grid of 4 pixels/mm (100 pixels/inch), with offsets of one pixel between colors. Given adequate LED brightness or otherwise adequate signal-to-noise ratio in the detector, the sources can be pulsed for shorter intervals and more frequently to maintain the standard $\frac{1}{12}$ mm or even $\frac{1}{24}$ mm pixel grid.

Benefits of pulsed illumination and source-based color separation are not limited to swath scanners. Rather these benefits are available and effective in row scanners and copiers as well.

Figure 4:
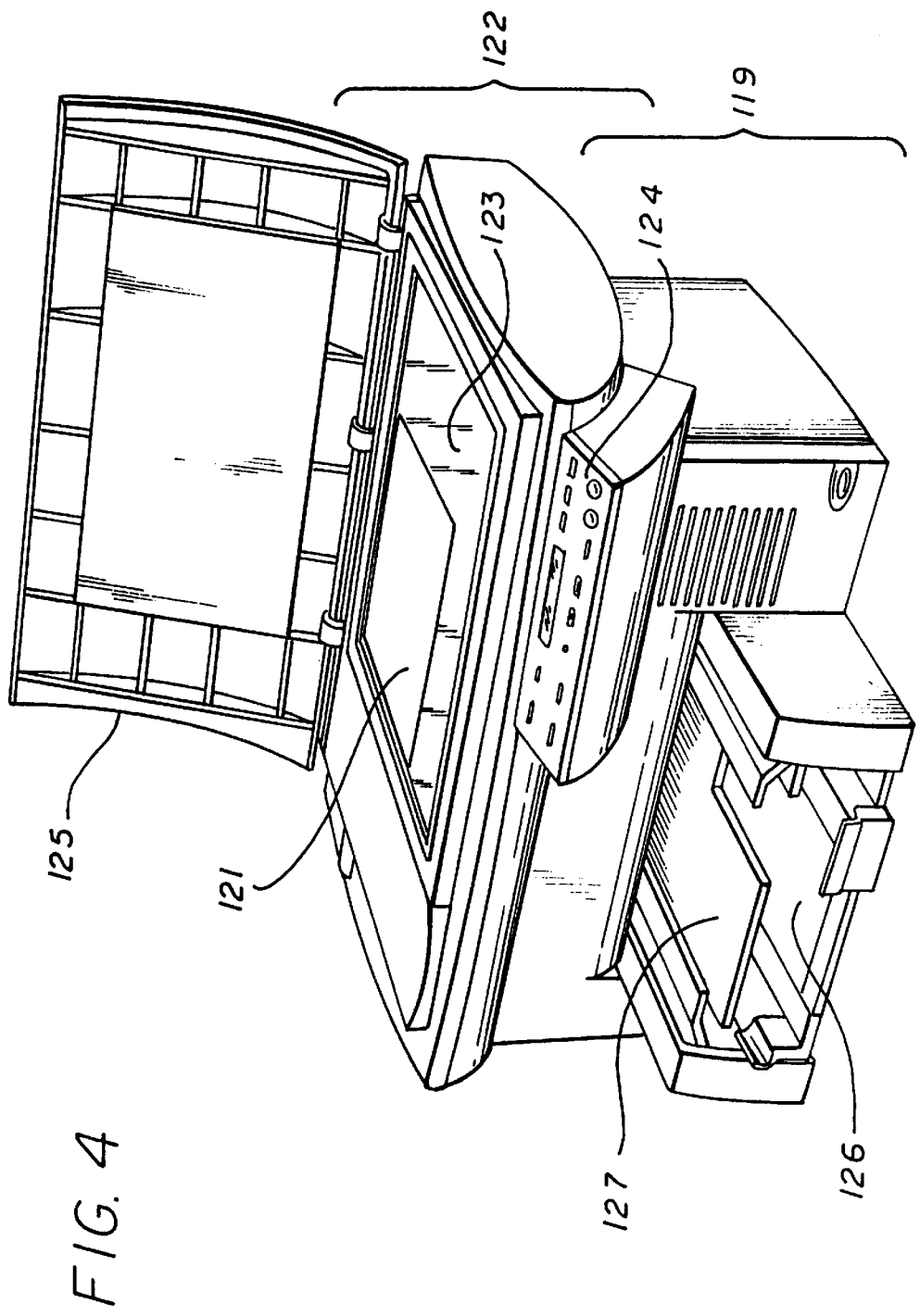
FIG. 4 is an isometric or perspective drawing of another preferred embodiment that is a representative bottom-view flatbed row-scanner with integrated printer, capable of functioning together as a copier—and shown with its cover raised.

A representative system is a desktop device for reproducing a document 121 (FIG. 4). The invention is equally applicable, however, to systems which provide only a scanner function, or only a printing function—or which instead, or also, include facsimile transmission or facsimile reception, or both.

A representative embodiment typically has a scanner section 122 and a printer section 119. The scanner section may include a transparent flatbed 123 for receiving the face-down original 121—which may be a sheet of image-bearing medium, as shown, or a book or magazine, or other type of object.

The invention applies as well to many other systems, for example a flat-platen system in which the transparent document-carrying platen translates past the scanner. It is also applicable to a system such as described by Dobbs et al. in which a document sheet instead travels through a system of slides, rollers etc. past a narrow stationary scanning slot where an imaging system reads a pixel row at a time.

Thus the invention encompasses a very large, pixel-based scanner/printer/plotter such as is used in a modern drafting room, as well as a desktop scanner/copier/FAX for office and home use.

In a representative desktop system, the scanner section 122 and printer section 119 typically share a control panel 124. A flat-platen or flatbed system typically includes a hinged cover 125.

Figure 5:
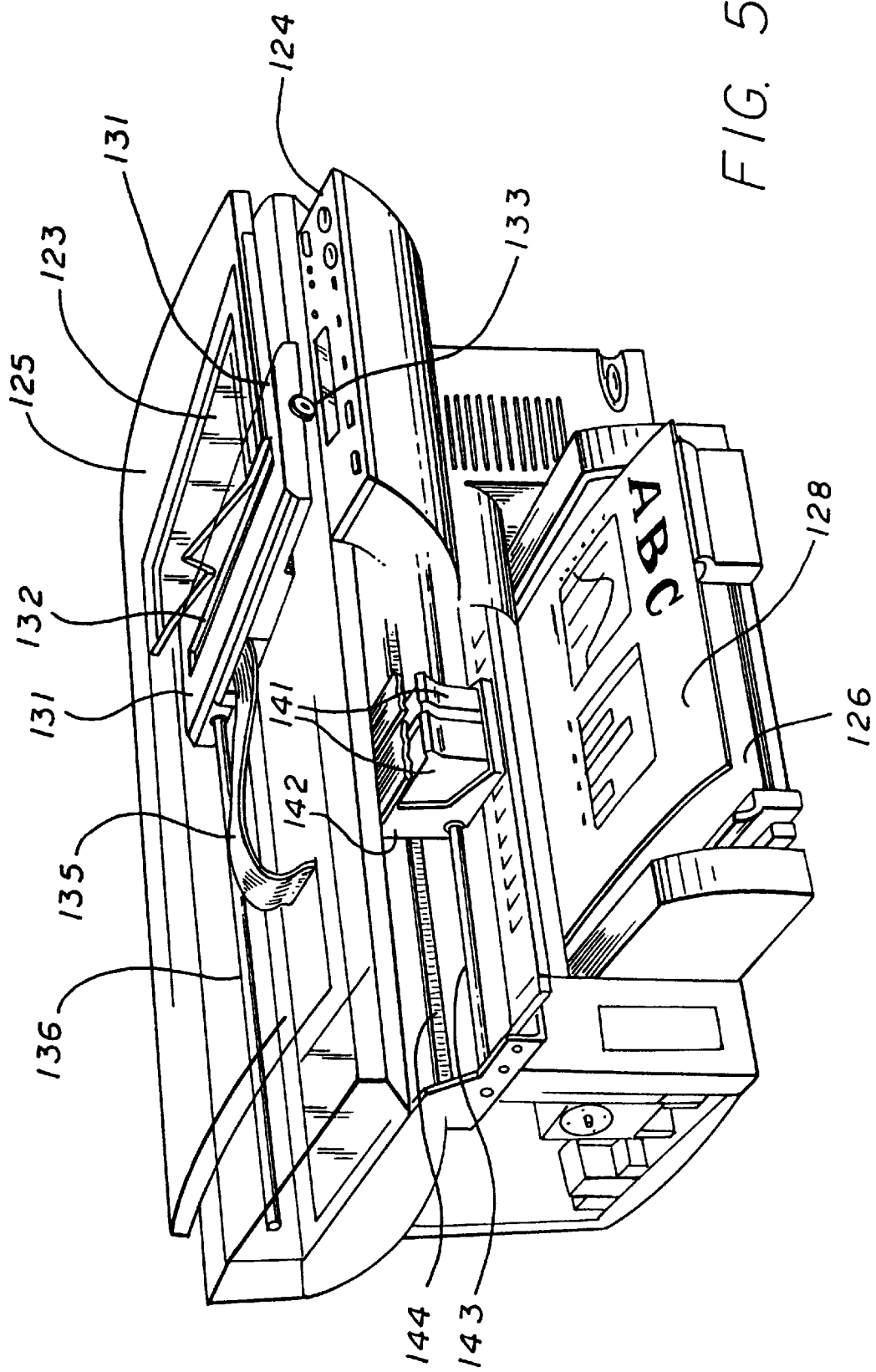
FIG. 5 is a like drawing of the FIG. 4 embodiment with its cover raised but with the cover and transparent flatbed platen drawn broken away to show portions of the apparatus interior.

The printer section 119 representatively includes an input tray 126 for supplying sheets of printing medium, such as paper, to receive reproduced images—and an output tray 127 for receiving the same sheets 128 (FIG. 5) after the sheets have been imprinted with those images. The invention, however, equally encompasses embodiments that use a continuous roll of print medium.

A representative stationary-flatbed system may include a row scanner having a linear sensor array inside a flat case 131, with a slot 132 for entry of light from a document on the transparent bed 123. The case has wheels 133 and is translated mechanically as by a leadscrew 136.

For color scanning, the sensor array is time shared by pulsed light sources of different spectral content as described above. In a traveling-scanner flatbed system, signals from a linear array may be coupled to the system electronics 113 as by a flexible ribbon cable 135 or equivalent.

Now as to the printing stage 119, any number of different pixel-based systems of the desktop-device art may be used as part of my invention—a representative system being inkjet printing. In that instance pens 141, preferably including a color pen and a black pen, ride in a carriage 142 along a support and guide rod 143. An encoder strip 144 enables determination of the carriage and pen position relative to the print-medium support system 126, 127—and to the associated transport system (not shown)—and thereby relative to each individual output sheet 128.

Figure 6:
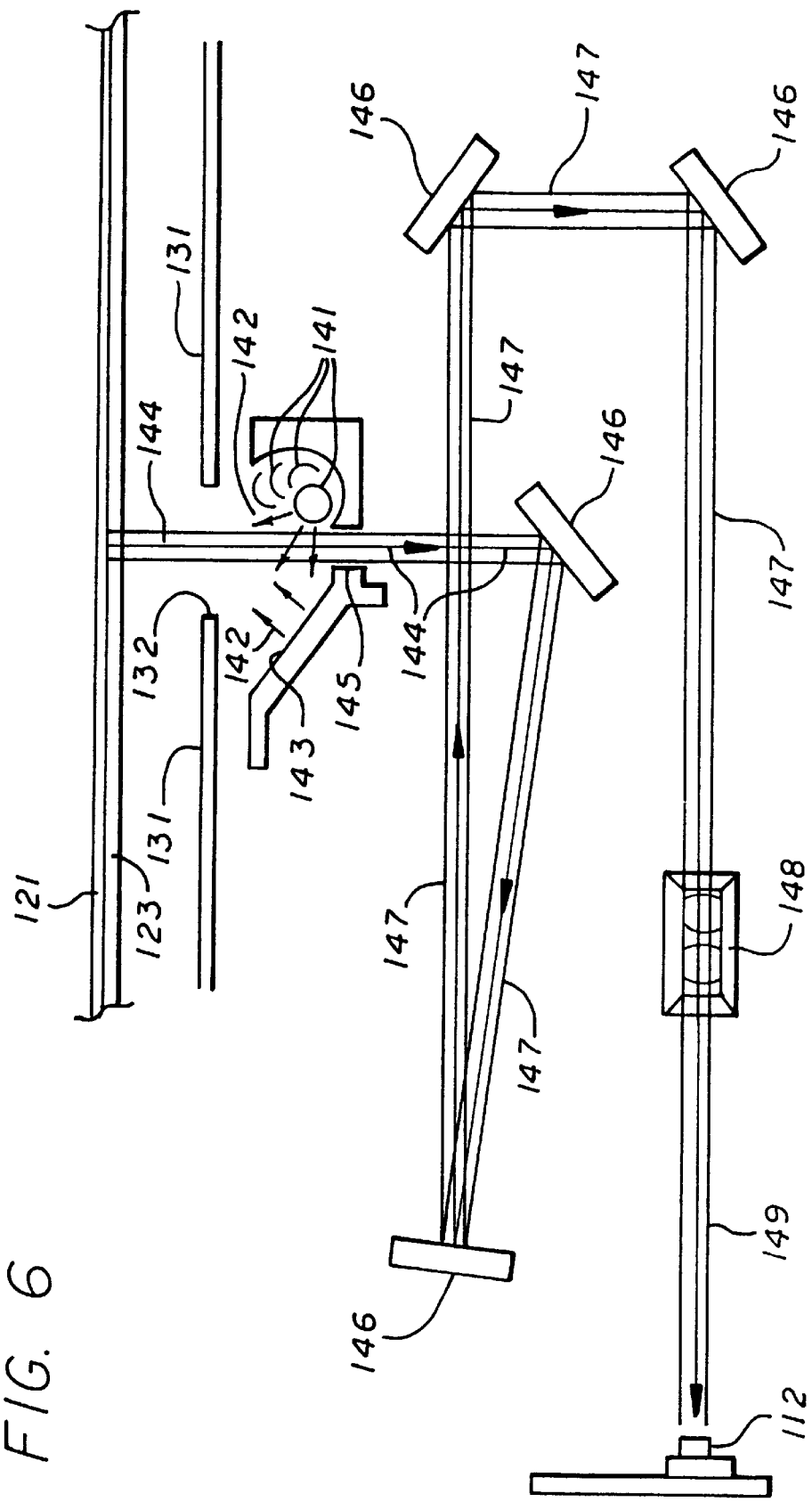
FIG. 6 is a diagram showing very schematically a representative optical train for the embodiment of FIGS. 4 and 5 in a color device.

A representative optical system for use in acquiring image data from a document or object 121 (FIG. 6), for practice of row scanner embodiments of the invention, includes a transparent flatbed or platen 123. Below this platen is a moving case 131 with slot 132—all corresponding to the previously discussed like-numbered elements in FIGS. 4 and 5.

Within the case and just below the slot 132 are three or four pulsed lamps 141, preferably three or four banks of LEDs. These lamps in sequence emit light 142—of different spectral distributions, respectively—upward toward the slot 132 and also laterally to a mirror 143.

(Where a fourth, infrared, source is included, that source is not necessarily sequenced with the other three, as such operation would sacrifice exposure time for visible-color scanning. Rather it may preferably be operated alone in a different operating mode, as for example just after loading a sheet of printing medium or a form, in a separate procedure to determine the character of the medium or form.)

The mirror reflects the laterally received light upward, adding additional light 142 to the illumination passing upward to and through the slot 132, and through the pane 123 to the document etc. 121. Light carrying visual details of the object, e. g. document, passes as a beam of light 144 down through a second slot 145 in the lamp assembly and so into an interior compartment of the traveling case 131.

Within that compartment the light is reflected from a series of folding mirrors 146, thus forming a convoluted beam 147 having a long path that leads to a lens 148, for forming an image of the document etc. 121 details. Beyond the lens is a short path 149 to a CCD array 112 or like sensor arrangement, positioned to receive the image.

The pathlength relationships establish suitable demagnification of visual details from the object 121, at the much smaller sensors 112. As mentioned earlier, the pulse-sequenced LEDs 141 provide temporal separation of colors in the light 144-147-149 approaching the monochrome sensor array 112.

Figure 7:
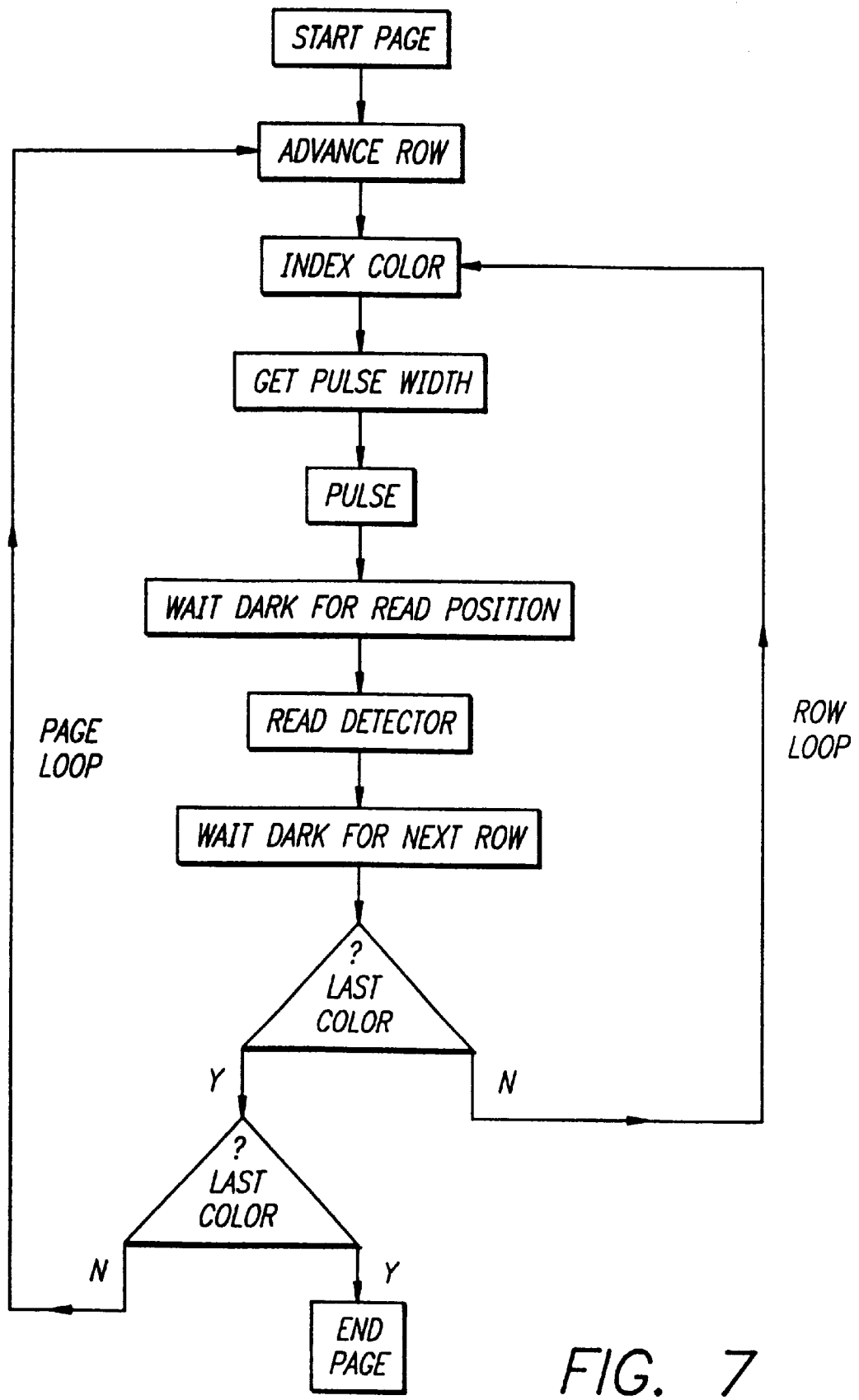
FIG. 7 is a block diagram showing very schematically certain firmware modules in a row scanner producing color data that are row-interleaved.

The drive and data interface circuit (FIG. 3) and master processor in the printer or computer require firmware (FIG. 7) to impose the desired row-interleaving, and to establish dark intervals. Only very simple sequencing is needed.

Figure 8:
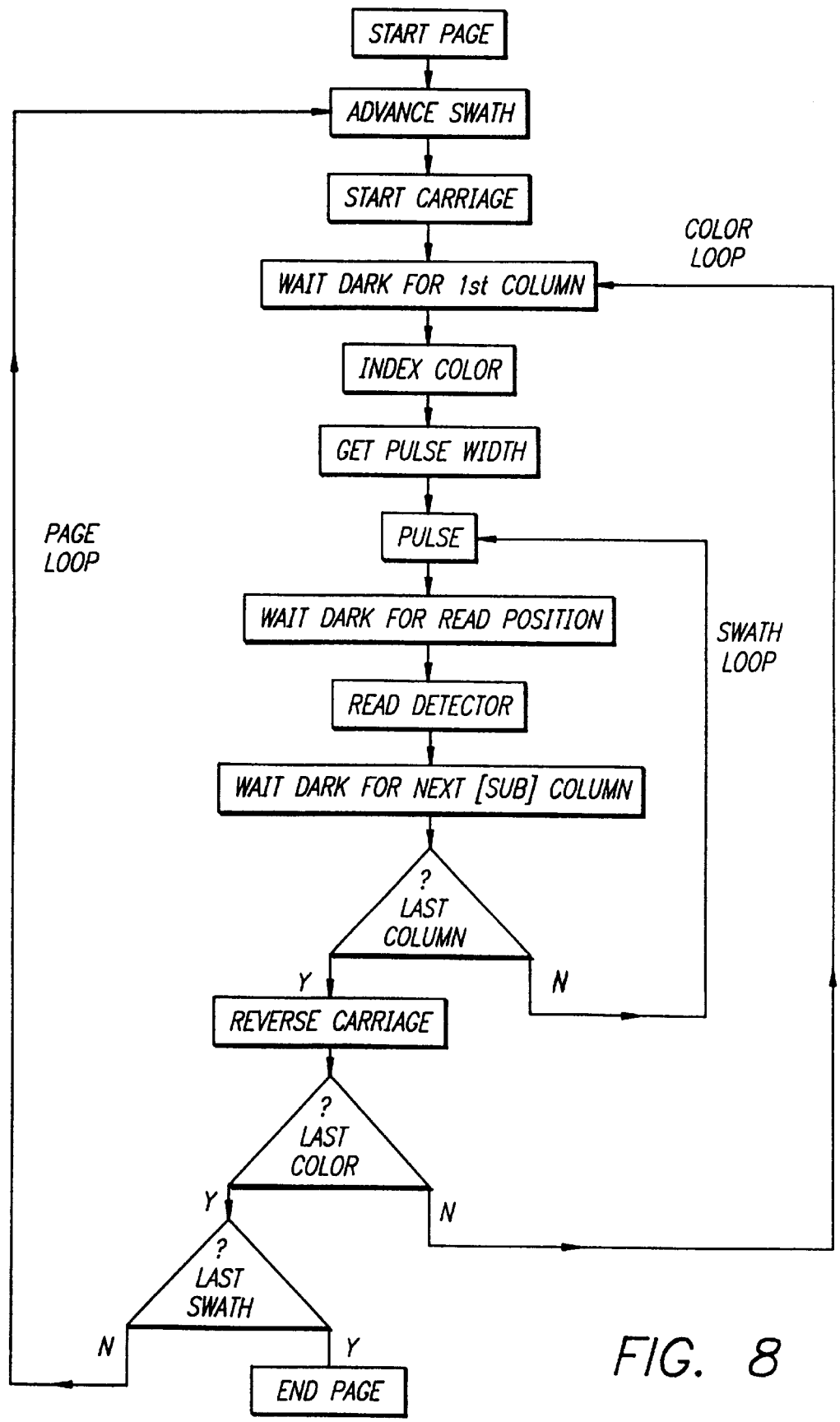
FIG. 8 is a like diagram for a swath scanner producing color data that are swath-interleaved.

We return now to our discussion of swath scanners. Since positioning is determined and controlled very precisely through the encoder strip, the image medium can be scanned for each color in turn (FIG. 8) before moving the medium-advance mechanism, without color-registration problems. Such operation may be identified as providing "swath interleaved" color data.

Figure 9:
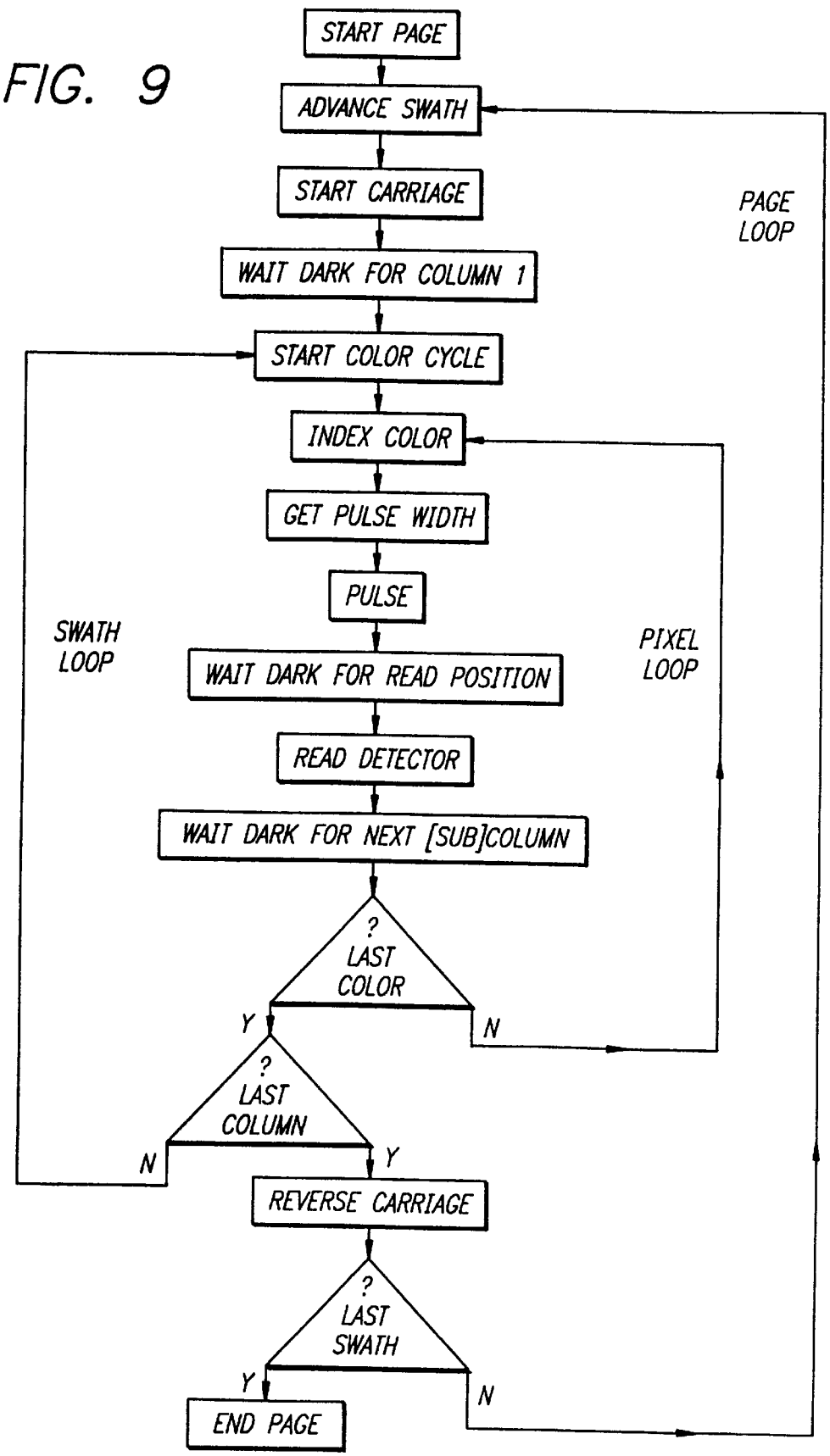
FIG. 9 is a like diagram for a swath scanner producing color data that are column-interleaved.

We prefer, however, to instead operate the three LEDs in sequence at each pixel position (FIG. 9) to provide "column interleaved" color data. This operating mode appears preferable for its relative insensitivity to any possible movement of the image medium, and also—as suggested earlier—for reducing the amount of mechanical activity in the system.

To obtain such column-interleaving, for instance the carriage can be scanned at higher throughput with three times coarser resolution—or even possibly the same resolution, given brighter (or more) LEDs or an effectively more-sensitive detector. In this latter regard, a limiting factor is not raw detector sensitivity as such but rather the usable or effective value of the sensitivity, taking into account signal-to-noise ratio in the detector.

Figure 10:
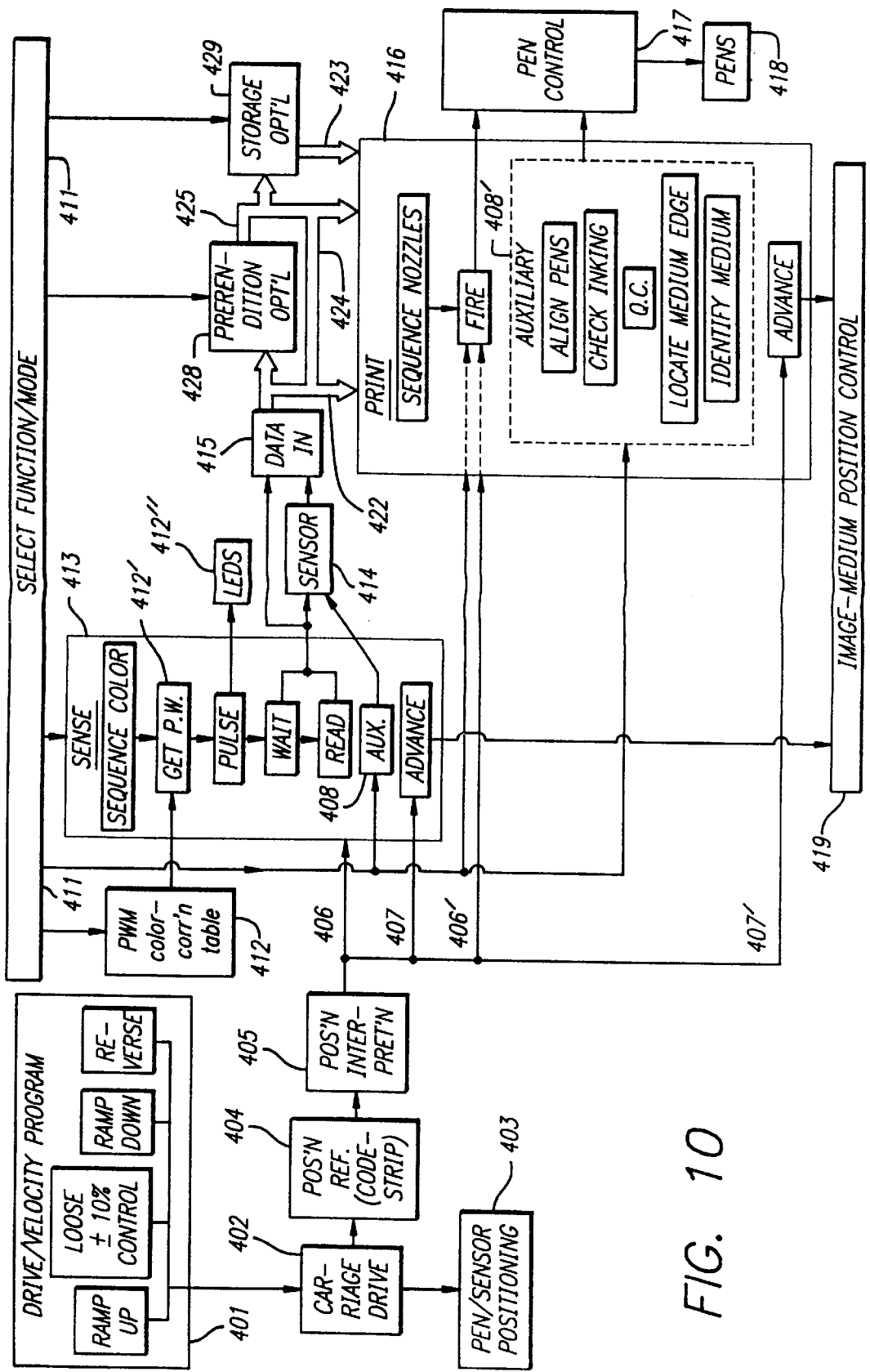
FIG. 10 is a like diagram of certain firmware modules in a scanner-printer-copier with color precorrection and prerendition during scanning, with variable scan speed but no compensating amplitude adjustment, with auxiliary print functions, and with functional selection by the operator.

Swath scanning and swath printing together, in a common device, provide opportunities for sharing of almost the entire electronic and firmware system, as well as the mechanical transports and encoding facilities. Exploitation of these opportunities may include integration 406, 406', 407, 407' (FIG. 10) of the scan and print pixel grids, color precorrection 412, 412' and prerendition 428 at scan time to enable particularly rapid and simple printout 416 later if desired, and auxiliary print functions 408, 408' relying on the scanner sensor 414.

The scanner stage 413–415, 421–429 as well as the printer stage 416–418 can be designed to take advantage of the variable scan speed—without any compensating amplitude adjustment or dummy-pixel readout interjected in the signal path 421–425 from detector 414 and analog-to-digital conversion (ADC, not shown) to printing 416 or storage 429. FAX capability is also added straightforwardly. Preferably the system provides for selection 411 of scan, print, copy or FAX functions by the user.

The foregoing discussion introduces embodiment of our invention both in row scanners and in swath scanners. Common to these two types of devices are our innovations of underpulsing and PWM color correction.

We prefer to provide dark intervals (441, FIG. 11) between pulses—whether pulses of the same color, as in a monochrome scanner or copier, or pulses R, G, B of different colors for color work. This provision is key to gaining optimum independence from the rigid sequencing requirements of CCDs and other integrating detectors.

With dark intervals 441 included in the sequence, clock signals SI (or "init") to initiate detector readout are simply generated during those intervals. Each clock SI is provided early in its respective dark interval, to allow ample time for conclusion of the respective readout shift sequence RD.

Some CCDs have a sample-and-hold feature that allows analog input data to be held in shadow storage, upstream of analog-to-digital conversion. Using this feature the dark interval for near-overlapping colors can be minimal: after the first eighteen readout clocks, the detector array can begin integrating the next data set.

No new pulse R, G, B begins until well after each detector readout period RD concludes. Accordingly the data acquisition and readout phases are made mutually independent, thereby ensuring independence from pixel-line-acquisition frequency (i. e., scan velocity 442, 442', 442", 442''') as well.

In scanner operation at seven dots per millimeter (180 dots/inch), a fixed periodicity for each measurement subinterval—i. e., for each color—is readily used; however, at twelve dots per millimeter (300 dots/inch), in which the worst-case readout allowance is five hundred microseconds, preferably a short dark interval of about six microseconds is inserted, allocating no more than four hundred microseconds to the whole active part of the cycle.

When scan velocity 442 is relatively high, the temporal clearance or guarding dark interval 443 between each light pulse, e. g. pulse B, and its following readout-initialization pulse SI is minimal. The dark interval is particularly small for the widest LED pulse B (arbitrarily in FIG. 11 the blue pulses B are selected for illustration as longer than the others).

Where scan velocity 442' is low, the clearance 443' between e. g. the longest light pulse B and following "init" pulse SI lengthens. The exposures, however, continue unchanged since the respective widths of all the pulses R, G, B remain as before.

Similarly the data-readout intervals RD remain unchanged. Further, each of these intervals is separated by another dark interval 444 from the respective succeeding light pulse R, G, B—again to ensure orderly completion of the readout sequence and thereby ensure data independence of scan velocity.

Where PWM color correction is desired, the pulses of different-color light are assigned correspondingly different durations. To consider a simplified example: if reproduced images tend to have a yellowish cast, the pulses B for blue may be widened (as illustrated) at the expense of the pulses G, R for green and red—while, for example, maintaining constant the overall total of time devoted to pulses.

In practice the relative intensities of LEDs from a common manufacturer tend to be better balanced than that simplified example might suggest. The degree of adjustment desired is therefore typically more subtle.

On the other hand, where arithmetic color-space conversion is required, PWM may be used in the nature of a preliminary adjustment to make the arithmetic procedures well behaved. For example such adjustment may be helpful to make all color components "positive", etc.

If no color correction is required or desired, then all three sets of pulses R, G, B can be of like width. This condition is illustrated as between red and green, for which the LED colors are taken to be intrinsically balanced.

Variable scan velocity too is to a certain extent common to both row and swath scanners in the sense that both scanners are subject to unintended variations in advance velocity of the scanning mechanism. As mentioned earlier, such variations 442/442'/442" can arise from e. g. frictional irregularities in the mechanism.

Velocity changes are more important in swath devices, however, because here deliberately introduced speed variations—and in fact direction reversals—are both inherent and frequent. Thus each pass of a swath scanner begins with acceleration 445 from zero velocity and ends with deceleration 446 to zero velocity for turnaround 447, followed by negative acceleration, i. e. acceleration 448 in the retrace direction—occurrences which are required many times per page.

Our invention takes all such velocity changes calmly in stride without losing pixel registration, color interleave sequence or color balance. Pulse widths are unchanged in the process.

Figure 13:
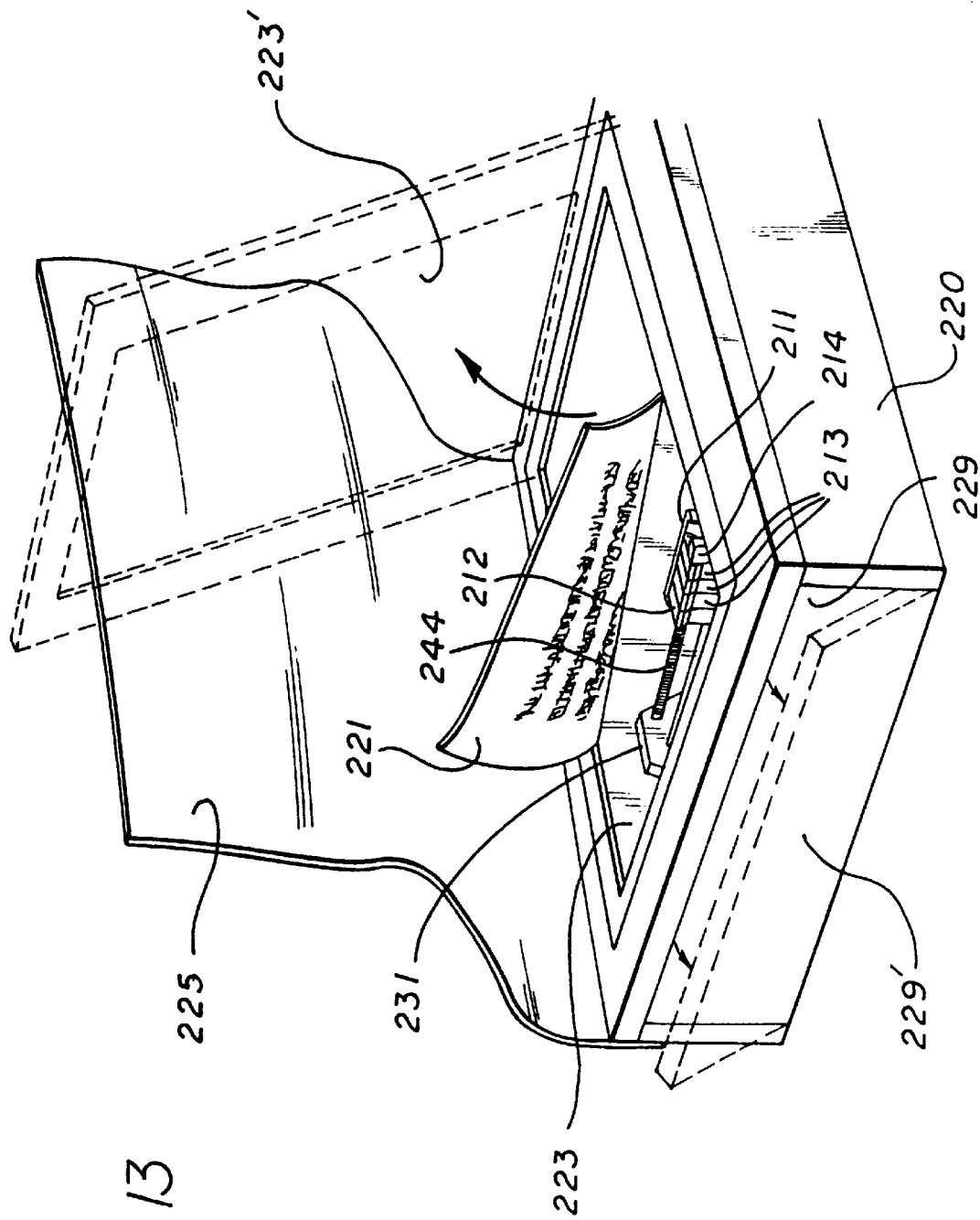
FIG. 13 is a sketch of a bottom-view dual-flatbed scanner-printer-copier with advance-axis gantry shared by the image input and output stages, and including a position codestrip—shown with its flatbed scanner platen in operating position.
Figure 14:
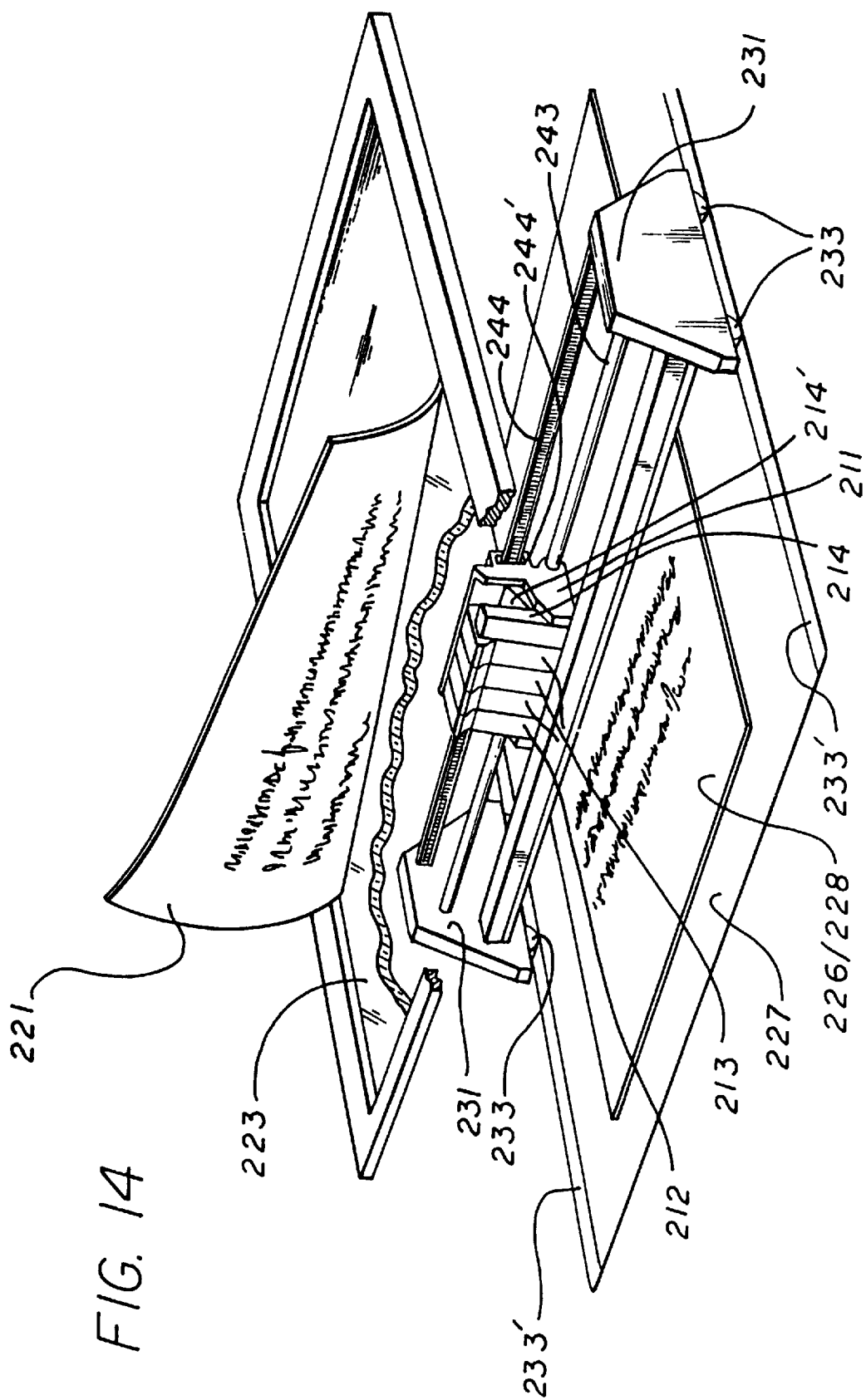
FIG. 14 is a sketch of the FIG. 13 device with the scanner platen hinged up for easier access to the printing platen.

More particular to swath scanners is the use of LIFO column reversal (FIG. 12), because this innovation imparts particularly beneficial capabilities to certain swath-based configurations such as shown in FIGS. 13 and 14—and also because storage of just one or two swaths suffices, whereas a row-scanner equivalent (i. e., a row scanner with LIFO row reversal) would require storage of substantially an entire image. Nevertheless such a LIFO row-reversal device is useful, as for instance in making mirror images.

In using LIFO column reversal a system performs its first, forward pass 451 (FIG. 12) with no printing. In this pass 451 the system only reads, acquiring data for pixel columns a (the left-hand column) through z (the right-hand, final column).

After changing direction the system performs a retrace pass 452 in which the data just acquired for columns a through z are printed—but in reverse order, starting with column z and ending with column a. At the same time new data are acquired from the next swath, now starting with the right-hand column z' (read while printing data for z of the just-acquired swath) and concluding with the left-hand column a' (read while printing data for just-acquired column a) of this second swath.

Thus for this mode of operation it is advantageous for the sensor and printheads to be offset by one swath. In each subsequent sweep 453, 454 etc. of the carriage, data are acquired for one column a . . . z within the swath while printing the data acquired for the same respective column a' . . . z' of the preceding swath—until the final swath 455, which is a retrace swath in which only printing occurs.

Swath-scanner aspects of our invention are very accommodating of diverse mechanical variants, whether to optimize devices for special markets or optimize enjoyment of the benefits of the invention itself. The invention is advantageously embodied in a dual-opposed-flatbed device which is a scanner-printer-copier.

Here a single transport system 211, 243, 233 (FIGS. 13, 14) not only serves double duty for both scanning and printing, but does so simultaneously. As in all preferred swath-scanning embodiments of the invention, such a system preferably includes a belt-driven carriage 211—which reciprocates in a "scan axis" along a support and guide bar 243—and a position encoder strip or "codestrip" 244 (FIGS. 13 and 14) with associated sensor 244' on the carriage 211, to determine instantaneous position and speed of the carriage.

Similarly the system includes some mechanism for providing relative movement in an orthogonal direction or "medium advance axis"—here implemented in the form of a gantry 231 with wheels or pinions 233, for bodily shifting the carriage 211 with its guide bar 243 and codestrip 244 along a pair of tracks or racks 233'. The gantry 231 is advanced by a separate leadscrew, or by a motor on the gantry to drive the pinions 233, or for best economy a belt drive with advance-axis encoder strip; or by some other swath-advance mechanism as preferred.

The carriage 211 and gantry 231 operate in the space between the two parallel, stationary flatbeds—i. e., between the upper, transparent platen or bed 223 and the lower bed 227. Mounted on the carriage 211 are an upward-pointing sensor 214, 214', for reading an original 221 on the upper platen 223, and downward-pointing pens 212, 213 for printing on a sheet 226/228 of printing medium on the lower platen 227.

This system can be used to scan or copy a magazine, pamphlet or book page, as well as a standard sheet 221 of image-bearing medium—whichever is user-positioned on the transparent upper platen 223. The system is also useful with small or irregular pieces of image medium—such as enumerated earlier—and other items not readily passed through document-transport machines.

An opaque soft cover 225 is advantageously provided to suppress stray light, in event room light is strong, and so optimize performance of the pulsed-LED data-acquisition modules. To facilitate user access to the lower platen or bed 227 for positioning or removing a sheet of printing medium 226/228, the upper platen 223 and front wall 229 of the case are advantageously mounted for hinging respectively upward and forward, to respective open positions 223', 229'.

It is preferable to protect the gantry trucks 231 in the left and right end zones, when the gantry is rolled forward into the operating region over the print-medium position—and also to protect the entire carriage 211 and gantry 231 when they are rolled rearward and stowed at the back of the case. For this purpose horizontal shields (not shown) run along the sides and rear of the case, extending inward from the upper edges of the side walls 220 and the rear wall.

This image-related device can be used to print or scan separately. While it can also be used to print one document while scanning another, such independent operation does not appear to represent the most efficient use of the system resources. Independent operation may require some duplication of data channels as well as some awkwardness for a user.

Highest and best use of this system arises in substantially simultaneous scanning and printing in a copying mode—i. e., one in which the document 226/228 being printed is a copy of the document 221 being scanned. This copying mode is particularly resource-efficient in that the single carriage 211 and gantry 231 (and their control systems) position and guide actuation of both the upward-directed scan sensor 214/214' and the downward-directed black pen 212 and (if present) color pen or pens 213 in common, simultaneously.

To facilitate use of the same, upward-pointing sensor 214 for both scanning and auxiliary print functions, the sensor may be oriented to collect its input beam along a horizontal axis and may be provided with a beam-path folding mirror 214'. This mirror may be mechanically movable between two orientations for receiving light selectively from the original 221 above a transparent platen 223 forming the upper flatbed, or from the printing medium 126/128 in the lower bed of the dual-flatbed system.

Alternatively the mirror or some other element may be an electronically controllable optical switch, such as a voltage-controlled dichroic element, for selection of the beam-receiving direction without moving parts.

Meanwhile the single gantry 231, and its control system, position the carriage 211 along the medium-advance axis stepwise, and synchronize scanning of the carriage with the gantry steps. Such operation is possible by virtue of parallel alignment for the dual opposed beds 223, 227 holding the original 221 and copy 226/228.

If the document 221 does not require color rendition, the machine can be set (or in some cases can automatically detect this condition and set itself) to print in a substantially direct-transfer mode. In this case the pens print the same swath that is being scanned.

These operations can be literally almost simultaneous, pixel column for pixel column within the swath, if a mirror image of the original is desired or acceptable (FIG. 15). This data flow is not only first-in/first-out (FIFO) but immediate. In a sense this mode of operation seems more natural since it requires neither delay nor reversal of column sequencing.

Figure 16:
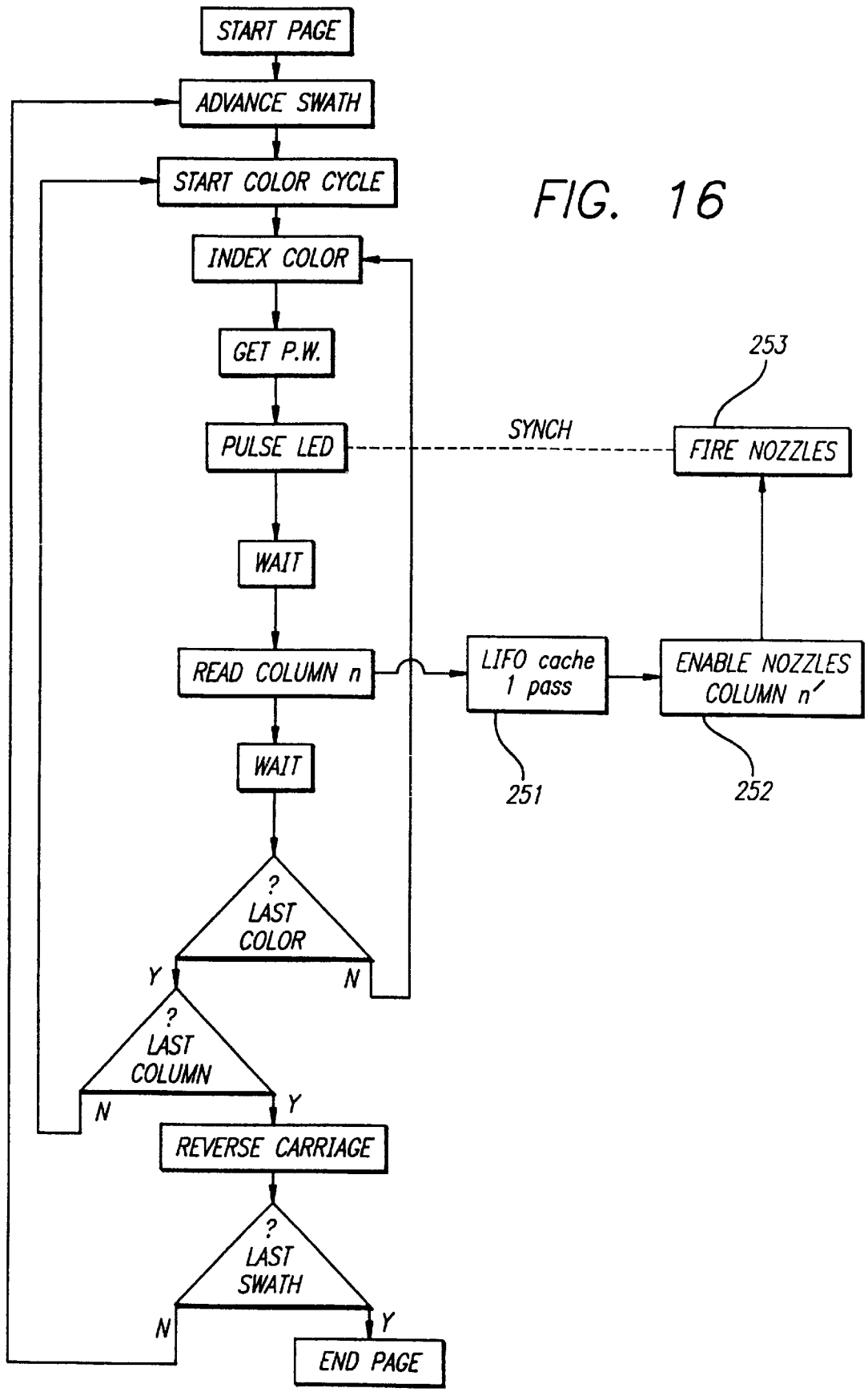
FIG. 16 is a firmware block diagram showing very schematically operation of the device of FIGS. 13 and 14 in a scan-forward/direct-print-retrace operating mode.

Otherwise, and more commonly, the system is typically set to print on retrace (FIG. 16) the swath just acquired in forward sweep—but playing back all the pixel columns in opposite, LIFO order (FIG. 12). The excellent efficiency of the system in positive-image mode is seen by comparing FIGS. 9 and 16: extremely little added hardware and firmware 251–253 are needed to print the image being acquired; the mirror-image mode of course requires even less.

For greater throughput the sensor 214, 214' and pens 212, 213 are mutually offset along the advance axis by one or two swaths—or subswaths, if scan/print modes are to be used in the machine. Such offset enables both forward and retrace scanning, and printing too—but always printing the swath acquired in the previous sweep, whether forward or retrace. Offset may be either mechanical offset of the pen and sensor themselves, or data caching with mechanical offset of the input and output documents.

Thus in a first, forward sweep for example only scanning of a first swath or subswath occurs, while the printheads are quiescent; then in a second, retrace sweep a second swath or subswath is scanned while the pixel columns of the first are printed on a last-in/first-out (LIFO) basis. Next in a third, forward sweep a third swath or subswath is acquired while the second is printed in the same LIFO order—and so on until the last swath or subswath is printed on retrace while the scanner rests.

The sensor and pen swath heights are advantageously selected so that a document carrying rows of text at a standard spacing can be scanned and printed without splitting characters between swaths—provided that the text is aligned on the upper bed reasonably parallel to the scan motion. The apparatus can be programmed to recognize these conditions (either with or without the aid of an operator setting), and if so to appropriately index the gantry for the first swath and thereby set up the machine for highest-speed operation down the page, for both the scan and print stages in common.

In the same case the apparatus can be programmed to recognize that a later line is split between two swaths (as for example due to nonstandard original line spacing, or due to the document being used as an original having itself been made as a copy with a slight reduction or enlargement)—and to correct with a minor indexing up or down. For overall success of this operation, however, the sensor and pen are preferably aligned rather than offset.

Figure 17:
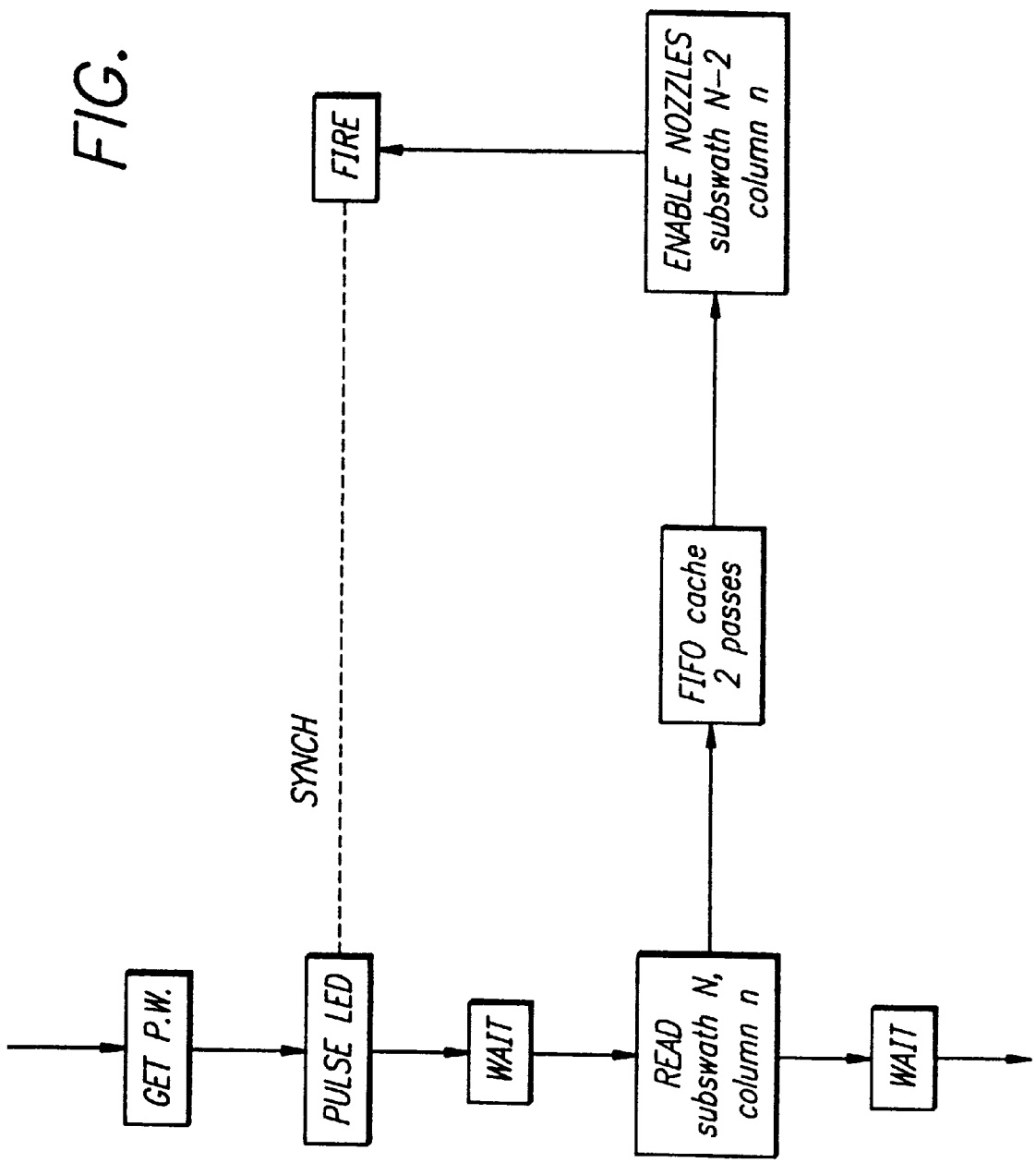
FIG. 17 is a partial like diagram showing departures from the FIG. 16 system for a delayed-subswath operating mode.

On the other hand, offset of the input and output stages is necessary in images of the type requiring color rendition. Offset or delay by a small number of subswaths (FIG. 17) is required to allow the processor to collect all the information necessary—particularly for some rendition techniques which tend to propagate data between adjacent swaths—before beginning to print the rendered swath. Such strategies appear necessary especially in the case of image structures spanning a swath boundary.

The above disclosure is intended as merely exemplary, and not to limit the scope of the invention—which is to be determined by reference to the appended claims.

What is claimed is:

1. An image-related device comprising:

a detector for generating a signal array in response to patterns of received light;

means for illuminating at least a portion of an object;

means for placing on the detector light from an illuminated portion of the object so that the signal array represents the object visually; and means for pulsing the illuminating means;

said pulsing means comprising means for differently setting durations of light pulses of different colors, respectively, to control color balance.

2. The image-related device of claim 1, further comprising:

means for separating colors of such object by automatically controlling the illuminating means to cyclically use light of successively different colors.

3. The image-related device of claim 2:

further comprising means for selecting successive portions of such object for placing by the placing means; and wherein the pulsing means comprise means for pulsing the illuminating means in synchronization with the selecting means.

4. The image-related device of claim 3, wherein:

the image-related device comprises a color swath scanner;

the selecting means comprise means for passing a sensor array across the object to select successive pixel columns within substantially each swath in an image; and the pulsing means comprise means for causing the illuminating means to emit one pulse of light for each pixel column during each pass of the sensor array across the object; and further comprising means for causing the illuminating means to emit light of different colors in successive passes, to produce swath-interleaving of color data.

5. The image-related device of claim 3, wherein:

the image-related device comprises a color scanner;

the selecting means comprise means for selecting successive pixel lines, each pixel line being:
- a pixel row of an image, if the scanner is a row scanner, and
- a pixel column within substantially each swath in an image, if the scanner is a swath scanner; and the pulsing means comprise means for causing the illuminating means to emit light pulses of respective plural colors in sequence, for each pixel line, to produce line-interleaving of color data.

6. The image-related device of claim 1, further comprising:

means for selecting, at a variable scan velocity, successive portions of such input object for placing by the placing means; and means for reading signals from the detector to generate such signal array; and wherein said device comprises substantially no means for adjusting amplitude of signals from the detector to compensate for variations in said variable scan velocity.

7. The image-related device of claim 6, wherein:

the pulsing means comprise means for setting durations of light pulses so that a dark interval occurs before substantially every pulse.

8. The image-related device of claim 1, further comprising means for applying the signal array to control at least one function selected from the following:

substantially concurrently printing onto a printing medium an image of the input object;

saving the signal array and later applying the signal array to control printing onto a printing medium an image of the input object; and transmitting information derived from the signal array to a remote device such as a facsimile receiver for printing by that remote device onto a printing medium an image of the input object.

9. An image-related device comprising:

pulsed illumination means for illuminating at least a portion of an input object with light pulses at intervals;

a time-integrating detector for generating a signal array in response to patterns of received light;

means for placing on the time-integrating detector light from an illuminated portion of the object so that the signal array represents the object visually;

means for selecting, at a variable scan velocity, successive portions of the input object for placing by the placing means on the time-integrating detector;

means for reading signals from the detector at intervals to develop the signal array; and means for synchronizing both the pulsed illumination means and the reading means with the selecting means; wherein:
- said variable scan velocity causes the reading intervals to vary; and
- said device comprises substantially no means for adjusting amplitude of signals from the detector to compensate for variations in said variable scan velocity.

10. The device of claim 9, wherein:

said variable scan velocity also causes the intervals between pulses to vary;

exposure at the detector is substantially independent of said intervals between pulses and said reading intervals; and variation in exposure arises substantially exclusively from the input object, brightness of the illuminating means if variable, and duration of the pulses.

11. The device of claim 9, wherein:

the pulsed illumination means comprise means for setting the pulses so that a dark interval occurs before substantially every pulse.

12. The image-related device of claim 11:

further comprising means for determining the carriage position with respect to the holding means; and wherein the selectively actuating means operate in accordance with the position determined by the determining means.

13. The image-related device of claim 12, wherein:

the position determining means comprise a combination of a codestrip disposed across the holding means, a sensor carried on the carriage for reading the codestrip, and parts of a programmed microprocessor for interpreting signals produced in response by the sensor; and said pulsing means comprise means for causing the illuminating means to emit light pulses synchronized with pixel positions as determined by the position determining means.

14. An image-related device comprising:

a substantially unitary detector for generating a signal array in response to patterns of received visible and invisible radiation;

means for illuminating at least a portion of an object with visible radiation of plural colors or with invisible radiation;

selection means for actuating the illuminating means to provide said visible radiation or said invisible radiation selectively;

means for placing on the detector radiation from an illuminated portion of the object so that at least part of the signal array represents the object visually; and whereby the detector selectively generates a signal array in response to visible or invisible indicia of the object, respectively.

15. The device of claim 14, for use in printing on various types of printing media, each of which types bears invisible indicia identifying that type of printing medium; said device further comprising:

means for interpreting a signal array from the detector in response to the invisible indicia to determine what type of printing medium is in use; and means for adjusting printing parameters to accommodate a type of printing medium which is in use.

16. The device of claim 14, for use in printing on various types of partially preprinted forms, each of which types bears invisible indicia identifying that type of form; said device further comprising:

means for interpreting a signal array from the detector in response to the invisible indicia to determine what type of form is in use; and means for controlling printing to print information into a type of form which is in use.

17. An image-related device comprising:

a detector for generating a signal array in response to patterns of received light;

means for illuminating at least a portion of an object;

means for placing on the detector light from an illuminated portion of the object so that the signal array represents the object visually;

pen means for applying the signal array to print an image of the object on a printing medium; and means for using the same detector to perform at least one auxiliary printing function selected from the group consisting of:
determining whether the pen means are out of ink or ink is running low,
determining the quality of printing by the pen means,
if the pen means comprise plural pens, determining the mutual alignment of the pens, and
locating the edge of the printing medium, generally concurrently with printing thereon.

18. The image-related device of claim 17, wherein:

in receiving light from the object, the detector receives light from a first direction;

in receiving light for said auxiliary printing function, the detector receives light from a second direction different from the first direction; and said device further comprising:
means for selecting the direction from which the detector receives light.

19. The image-related device of claim 18, wherein the selecting means are selected from the group comprising:

means for mechanically inverting the detector;

means for mechanically reversing the detector;

means for mechanically changing the direction in which the detector points to receive light; and electrooptical means for switching the direction from which the detector receives light.

20. An image-related device for producing a signal array that corresponds to an image of an input object; said scanner comprising:

means for acquiring a subarray of signals corresponding to a swath of such object;

means for sequentially defining different swaths for processing by the acquiring means, to produce a signal array as a sequence of said subarrays; and means for controlling the defining means so that successive swaths overlap.

21. The image-related device of claim 20, wherein the different swaths have a substantially common height and wherein:

the sequentially defining means comprise means for providing relative motion of such object and the acquiring means;

the controlling means comprise means, selected from the following group, for reducing conspicuousness of errors in the relative motion provided by the sequentially defining means:
means for selecting pixel patterns, for acquisition, which include linear sequences oriented at a shallow angle to said relative motion,
means for rotating acquisition patterns without concurrent provision of said relative motion, near an end of such object where said relative motion is particularly subject to error, and
means for providing said relative motion in steps that are an odd submultiple of a swath height.

22. The image-related device of claim 20:

wherein the sequentially defining means produce said signal array in a form that is usable substantially directly in printing; and further comprising means for applying the signal array substantially directly to control formation on a printing medium of a corresponding image;

said applying means comprising means for printing a swath of said corresponding image from each subarray of signals, respectively.

23. The image-related device of claim 22, wherein:

the acquiring means comprise:
plural illumination means, having respective plural spectral distributions, for providing respective plural input-object optical image information sets modulated by said respective plural distributions, and
detection means for receiving said plural optical image information sets and in response generating corresponding respective signal sets;

said plural spectral distributions depart significantly from standard industrial light-source spectral distributions;

said defining means comprise means for receiving said generated signal sets and, in response to said received sets, producing derivative signal sets adjusted for departure of said plural spectral distributions from said standard distributions.

24. An image-related device comprising:

a swath scanner for generating a signal array by mechanically scanning a sensor across an input object, to acquire successive pixel columns of a pixel swath of the object;

a swath printer for printing an image from the signal array by mechanically scanning pen means across a printing medium, to print successive pixel columns of a pixel swath of the object;

means for electronically reversing the order of acquired pixel columns, in the signal array, for use by the swath printer in printing successive columns of the swath.

25. The device of claim 24, wherein:

the reversing means leave unchanged the order of pixels within each column.

26. The device of claim 24, wherein:

the swath scanner and swath printer share a common substantially unitary carriage for scanning the sensor and the pen means together along a scan axis across the object and the printing medium;

the carriage also undergoes relative motion with the object, along an advance axis orthogonal to the scan axis;

the carriage also undergoes relative motion with the printing medium, along the advance axis; and along the advance axis, the carriage motion relative to the object and the printing medium is in a common direction.

27. An image-related device comprising:

a swath scanner for generating a signal array by mechanically scanning a sensor across an input object, to acquire successive pixel columns of a pixel swath of the object;

a swath printer for printing an image from the signal array by mechanically scanning pen means across a printing medium, to print successive pixel columns of a pixel swath of the object;

means for electronically reversing the order of acquired pixel columns, in the signal array, for use by the swath printer in printing successive columns of the swath;

dual means for holding the object and the image medium;

a carriage mounted for, and driven in, transverse motion across the holding means;

means for determining the carriage position with respect to the holding means;

wherein the sensor is disposed on the carriage for receiving light from the object;

wherein the pen means are disposed on the carriage for printing onto the printing medium; and means, responsive to the determining means, for selectively actuating both the sensor and the pen means, in accordance with the position determined by the determining means; and wherein the actuating means comprise means for both operating the detector array to acquire image-swath data and concurrently applying those data, subject to said reversal of column order, to control the pen for printing said image swath onto such image medium.

28. An image-related device for use in selectively operating as a rapid black-and-white copier, or as a high-quality black-and-white copier, or as a color copier, said image-related device comprising:

a swath scanner for generating a signal array by mechanically scanning a sensor across an input object, to acquire successive pixel columns of a pixel swath of the object;

a swath printer for printing an image from the signal array by mechanically scanning pen means across a printing medium, to print successive pixel columns of a pixel swath of the object;

means for electronically reversing the order of acquired pixel columns, in the signal array, for use by the swath printer in printing successive columns of the swath;

means for holding the object and the printing medium substantially mutually stationary;

a carriage holding a sensor of the swath scanner and pen means of the swath printer, mounted together for transverse motion relative to the object and the printing medium;

means for selection by a human operator between operation as a rapid black-and-white copier, operation as a high-quality black-and-white copier, and operation as a color copier; and means for providing relative motion, in a direction orthogonal to the transverse motion of the carriage, between (1) the carriage and (2) in common, both such object and such medium; and wherein the actuating means comprise automatic means selected from the group consisting of:
 if rapid black-and-white copying is selected, means for using the sensor to acquire an entire particular swath while the carriage is traveling in a forward direction, and for using the pen means on retrace to print the same entire swath; and
 if color copying or high-quality black-and-white copying is selected, means for using a composite acquisition-and-print mode to acquire and print partial swaths progressively.

29. The image-related device of claim 28, wherein the composite progressively-using means comprise:

means for using the sensor to acquire selected input pixel patterns from a swath whenever traveling in a forward pass;

means for operating the relative motion means to advance by a fraction of a swath along said orthogonal direction;

programmed microprocessor means for determining output pixel patterns to print by (1) combining selected input pixel patterns acquired in plural passes and, if color copying is selected, (2) performing color rendition; and means for using the pen means to print corresponding pixel patterns on retrace, but only after all input pixels in a particular swath have been acquired and processed.

30. The image-related device of claim 24, further comprising:

a transparent platen for holding stationary the object to be imaged;

means for holding stationary the printing medium in a position generally parallel to and spaced apart from the platen, and approximately aligned with the platen; and a carriage disposed between the platen and the printing-medium position, for both transverse and orthogonal motions generally parallel to both the platen and the printing-medium position; and wherein the detector array and the pen are oppositely directed for respectively receiving light from the platen and concurrently printing at the printing-medium position.

31. An image-related device comprising:

a swath scanner for generating a signal array by mechanically scanning a sensor across an input object, to acquire successive pixel columns of a pixel swath of the object;

a swath printer for printing an image from the signal array by mechanically scanning pen means across a printing medium, to print successive pixel columns of a pixel swath of the object;

a transparent platen for holding stationary the object to be imaged;

means for holding stationary the printing medium in a position generally parallel to and spaced apart from the platen, and approximately aligned with the platen; and common to the scanner and printer, a carriage disposed between the platen and the printing-medium position, and mounted for both transverse and orthogonal motions generally parallel to both the platen and the printing-medium position; and wherein the detector array and the pen are oppositely directed for respectively receiving light from the platen and concurrently printing at the printing-medium position;

all relative motion between the carriage and both the object and the printing medium is in a common sense, and no electronic reversal is provided;

whereby the printer prints a mirror image of the object.

* * * * *